United States Patent
Cho et al.

(10) Patent No.: US 11,428,950 B2
(45) Date of Patent: *Aug. 30, 2022

(54) LENS MOVING APPARATUS

(71) Applicant: LG INNOTEK CO., LTD., Seoul (KR)

(72) Inventors: Jae Hong Cho, Seoul (KR); Seung Taek Shin, Seoul (KR); In Jae Yeo, Seoul (KR); Sang Hee Lee, Seoul (KR); Jin Suk Han, Seoul (KR); Jung Cheol Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 323 days.

This patent is subject to a terminal disclaimer.

(21) Appl. No.: 16/566,190

(22) Filed: Sep. 10, 2019

(65) Prior Publication Data

US 2020/0004042 A1 Jan. 2, 2020

Related U.S. Application Data

(63) Continuation of application No. 14/884,412, filed on Oct. 15, 2015, now Pat. No. 10,451,891.

(30) Foreign Application Priority Data

Oct. 17, 2014 (KR) .................. 10-2014-0140848
Nov. 14, 2014 (KR) .................. 10-2014-0158687

(51) Int. Cl.
*G02B 27/64* (2006.01)
*G02B 7/09* (2021.01)
(Continued)

(52) U.S. Cl.
CPC ............ *G02B 27/646* (2013.01); *G02B 7/09* (2013.01); *G03B 3/10* (2013.01); *G03B 5/00* (2013.01);
(Continued)

(58) Field of Classification Search
CPC .......... G02B 27/646; G02B 7/09; G02B 7/08; G02B 27/644; G02B 27/46; G02B 27/64;
(Continued)

(56) References Cited

U.S. PATENT DOCUMENTS

| 9,769,363 B2 | 9/2017 | Cho et al. |
| 2002/0034022 A1 | 3/2002 | Nakamura |

(Continued)

FOREIGN PATENT DOCUMENTS

| CN | 101178470 A | 5/2008 |
| CN | 201096945 Y | 8/2008 |

(Continued)

OTHER PUBLICATIONS

Office Action dated Dec. 4, 2020 in Korean Application No. 10-2014-0140848.

(Continued)

*Primary Examiner* — Marin Pichler
*Assistant Examiner* — Alberto J Betancourt
(74) *Attorney, Agent, or Firm* — Saliwanchik, Lloyd & Eisenschenk

(57) ABSTRACT

A lens moving apparatus includes a bobbin on which a first coil is disposed, a first magnet disposed around the bobbin to face the first coil, and a housing, which is disposed to surround at least a portion of the bobbin and has a first magnet mounting seat, which receives the first magnet, wherein the housing is provided with an adhesive inlet, which allows a side portion of the first magnet mounting seat to communicate with an outside surface of the housing.

18 Claims, 27 Drawing Sheets

(51) Int. Cl.
  *G03B 5/00* (2021.01)
  *G03B 3/10* (2021.01)
(52) U.S. Cl.
  CPC .............. *G03B 2205/0007* (2013.01); *G03B 2205/0069* (2013.01)
(58) Field of Classification Search
  CPC . G02B 7/02; G02B 7/102; G02B 7/04; G02B 7/023; G02B 7/025; G02B 7/026; G02B 7/10; G02B 7/105; G03B 5/00; G03B 3/10; G03B 2205/0069; G03B 2205/0007; G03B 13/36; G03B 2217/005; G03B 2217/00; H04N 5/225; H04N 5/232; G11B 7/0932; G11B 7/0935
  USPC .............. 359/557, 554, 813, 819, 824, 823; 396/52, 53, 54, 55
  See application file for complete search history.

(56) References Cited

U.S. PATENT DOCUMENTS

| | | | |
|---|---|---|---|
| 2006/0181633 | A1 | 8/2006 | Seo |
| 2008/0117536 | A1* | 5/2008 | Higuchi ............ G02B 7/102 359/824 |
| 2008/0192124 | A1 | 8/2008 | Nagasaki |
| 2011/0286732 | A1 | 11/2011 | Hosokawa et al. |
| 2012/0008221 | A1* | 1/2012 | Min ................. H02K 41/0354 359/824 |
| 2012/0134034 | A1 | 5/2012 | Niwa et al. |
| 2012/0200176 | A1 | 8/2012 | Park |
| 2012/0229901 | A1 | 9/2012 | Moriya et al. |
| 2013/0010378 | A1 | 1/2013 | Wang |
| 2013/0016428 | A1* | 1/2013 | Sugawara ............ G02B 7/08 359/557 |
| 2014/0177056 | A1* | 6/2014 | Hayashi ............ G02B 7/08 359/557 |

FOREIGN PATENT DOCUMENTS

| | | |
|---|---|---|
| CN | 102565994 A | 7/2012 |
| CN | 102967912 A | 3/2013 |
| CN | 103091813 A | 5/2013 |
| CN | 103901701 A | 7/2014 |
| CN | 203786373 U | 8/2014 |
| JP | 2011-175027 A | 9/2011 |
| JP | 2014-126668 A | 7/2014 |
| KR | 10-0783362 B1 | 12/2007 |
| KR | 10-2008-0089692 A | 10/2008 |
| KR | 10-2008-0092492 A | 10/2008 |
| KR | 10-2011-0038232 A | 4/2011 |
| KR | 10-2013-0042755 A | 4/2013 |
| KR | 10-2013-0125476 A | 11/2013 |
| KR | 10-2014-0076329 A | 6/2014 |
| WO | WO-2013/168898 A1 | 11/2013 |

OTHER PUBLICATIONS

Office Action dated Feb. 9, 2021 in Korean Application No. 10-2014-0158687.
Office Action dated Feb. 27, 2019 in Chinese Application No. 201510680382.1, along with its English translation.
Non-Final Office Action dated Jul. 28, 2017 in U.S. Appl. No. 14/884,412.
Final Office Action dated Feb. 22, 2018 in U.S. Appl. No. 14/884,412.
Non-Final Office Action dated Nov. 19, 2018 in U.S. Appl. No. 14/884,412.
Notice of Allowance dated Jun. 11, 2019 in U.S. Appl. No. 14/884,412.
Office Action dated Nov. 30, 2021 in Chinese Application No. 202010588645.7.

* cited by examiner

LENS MOVING APPARATUS

CROSS REFERENCE TO RELATED APPLICATION

This application is a continuation of U.S. patent application Ser. No. 14/884,412, filed Oct. 15, 2015, which claims priority under 35 U.S.C. § 119 to Korean Patent Application Nos. 10-2014-0140848, filed Oct. 17, 2014, and 10-2014-0158687, filed Nov. 14, 2014, which are hereby incorporated by reference in their entirety.

TECHNICAL FIELD

Embodiments relate to a lens moving apparatus incorporated in a camera module.

BACKGROUND

Recently, information technology products such as cellular phones, smart phones, tablet PCs and notebook PCs, in which ultracompact digital cameras are incorporated, are being actively developed.

A camera module, which is incorporated in small-sized electronic products such as smart phones, is manufactured by assembling respective components, which have been separately produced, to constitute the camera module.

In the assembly of the camera module, a lens moving apparatus, which constitutes the camera module, may be provided with a magnet for driving a lens, and the magnet may be coupled to a housing by means of an adhesive or the like.

In order to couple the magnet to the housing, an adhesive is first applied to side and upper surfaces of a magnet mounting seat. In the coursed of such application, it is generally difficult to accurately control the quantity of the adhesive that is applied and to uniformly apply the adhesive to the magnet mounting seat. This is because the viscosity of the adhesive may vary depending on the kind of adhesive, the application temperature and the like.

Accordingly, if the quantity of adhesive that is applied is small or the viscosity of the adhesive is not in the proper range, the adhesive does not uniformly spread, thus causing defective adhesion. In this case, when a drop experiment is performed in order to establish the reliability of the product, defective, products in which the magnet is separated from the housing, may be evident.

Once the magnet is bonded to the housing, there is no solution for accurately determining whether a sufficient amount of adhesive has been uniformly applied. Accordingly, there is a need to additionally inject a sufficient amount of adhesive to the bonding area after the magnet is first attached to the housing so as to increase the force of adhesion between the magnet and the housing.

In the operation of attaching the magnet to the housing, when an excessive amount of adhesive is applied to the magnet mounting seat or when the viscosity of the adhesive decreases and the fluidity of the adhesive thus increases, due to the kind of adhesive, the application temperature or the like, even when an appropriate amount of adhesive is applied, the applied adhesive may flow down from the magnet mounting seat.

The adhesive, which has escaped from the magnet mounting seat and cured at another area of the lens moving apparatus, may obstruct movement of other components constituting the lens moving apparatus, thus causing malfunction or breakage of the lens moving apparatus. A protruding portion, which has been formed differently from intended design due to the cured adhesive, may incur severe defections in the autofocusing function and handshake correction.

When an adhesive flows down and is cured during the procedure of attaching the magnet, the cured adhesive may be removed using tweezers, a knife or the like. However, there is another problem in that other contaminants may adhere to the lens moving apparatus during the removal procedure.

When contaminants infiltrate the lens moving apparatus constituting the camera module in the assembly of the camera module, the infiltrated contaminants may cause malfunction of the lens moving apparatus, quality degradation of captured images or the like. Furthermore, the lens moving apparatus and the camera module have to be firmly assembled.

For these reasons, a bonding operation of filling gaps between respective components with an adhesive may be performed in order to prevent contaminants from infiltrating the gaps while the respective components may be firmly coupled to each other using the adhesive.

The bonding operation has to solve the above problems and has to be rapidly and efficiently performed.

BRIEF SUMMARY

Embodiments intend to provide a lens moving apparatus capable of increasing the bonding force between a magnet and a housing and a camera module including the same.

Furthermore, embodiments intend to provide a lens moving apparatus having a structure capable of firmly coupling respective components to each other and rapidly and efficiently performing a bonding operation of sealing gaps between components and a camera module including the same.

In one embodiment, a lens moving apparatus includes a bobbin on which a first coil is disposed, a first magnet disposed around the bobbin to face the first coil, and a housing, which is disposed to surround at least a portion of the bobbin and has a first magnet mounting seat, which receives the first magnet, wherein the housing is provided with an adhesive inlet, which allows a side portion of the first magnet mounting seat to communicate with an outside surface of the housing.

In another embodiment, a lens moving apparatus includes a housing for supporting a first magnet, a cover member surrounding the housing, a base disposed so as to be spaced apart from the housing by a predetermined distance, a bobbin on which a first coil is provided so as to be moved in a first direction, a support member disposed on a side surface of the housing so as to support the bobbin and the housing while allowing the bobbin and the housing to be movable in second and/or third directions perpendicular to the first direction, and a second coil disposed under the housing to move the support member in the second and/or third directions, wherein the housing includes a first magnet mounting seat for receiving the first magnet and an adhesive inlet allowing the outer surface of the housing to communicate with a side portion of the first magnet mounting seat.

In a further embodiment, a lens moving apparatus includes a printed circuit board, a cover member accommodating at least a portion of the printed circuit board, and a base, on which the printed circuit board is mounted and which is coupled to the cover member, wherein a first recess is defined by portions of end surfaces of the printed circuit board, the cover member and the base.

BRIEF DESCRIPTION OF THE DRAWINGS

Arrangements and embodiments may be described in detail with reference to the following drawings, in which like reference numerals refer to like elements and wherein.

DETAILED DESCRIPTION

Figure 1:
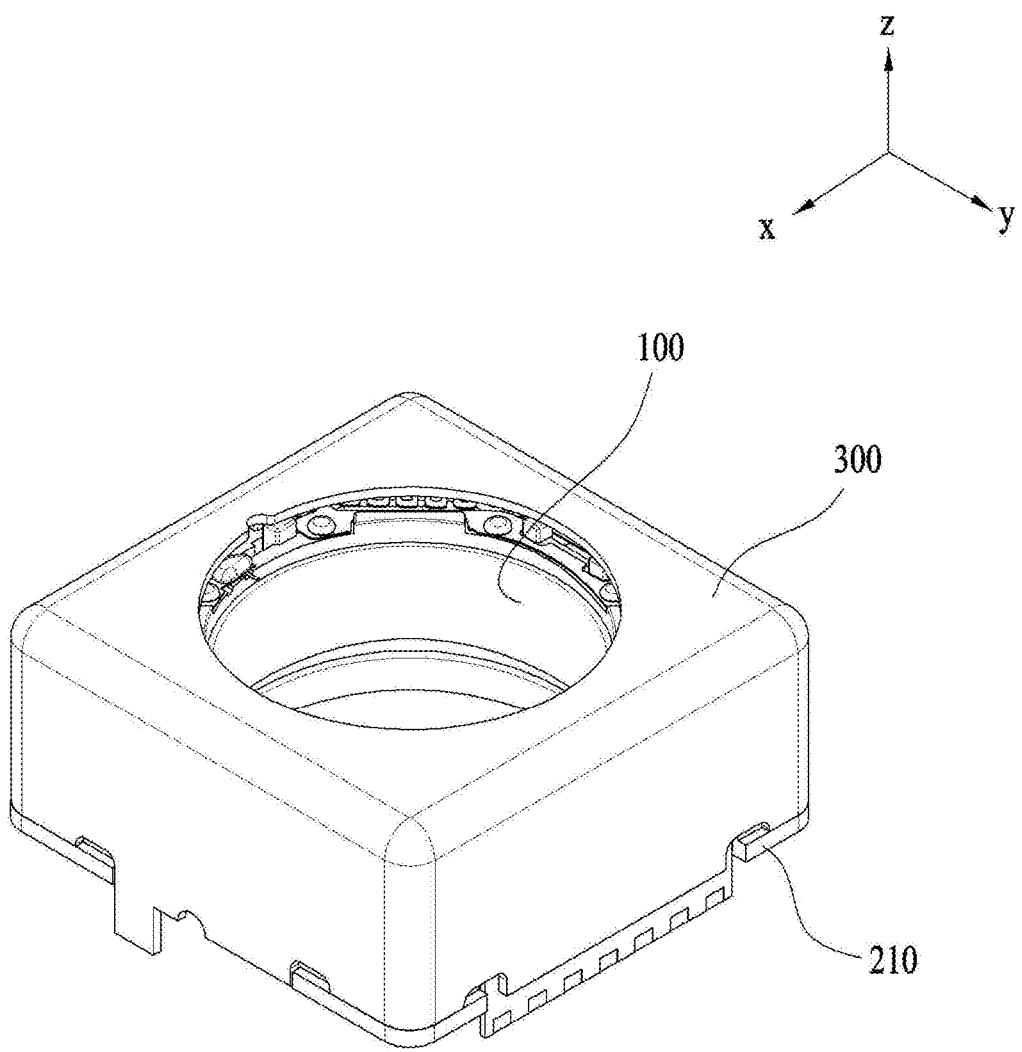
FIG. 1 is a schematic perspective view showing a lens moving apparatus according to an embodiment.

Hereinafter, embodiments will be described with reference to the attached drawings. In the drawings, the same or similar elements are denoted by the same reference numerals even though they are depicted in different drawings. In the following description, a detailed description of known functions and configurations incorporated herein will be omitted when it may make the subject matter of the disclosure rather unclear. Those skilled in the art will appreciate that some features in the drawings are exaggerated, reduced, or simplified for ease in description, and drawings and elements thereof are not shown always at the proper scale.

For reference, in the respective drawings, a rectangular coordinate system (x, y, z) may be used. In the drawings, the x-axis and the y-axis indicate a plane perpendicular to the optical axis, and for convenience, the optical axis (z-axis) direction may be referred to as a first direction, the x-axis direction may be referred to as a second direction, and the y-axis direction may be referred to as a third direction.

Figure 2:
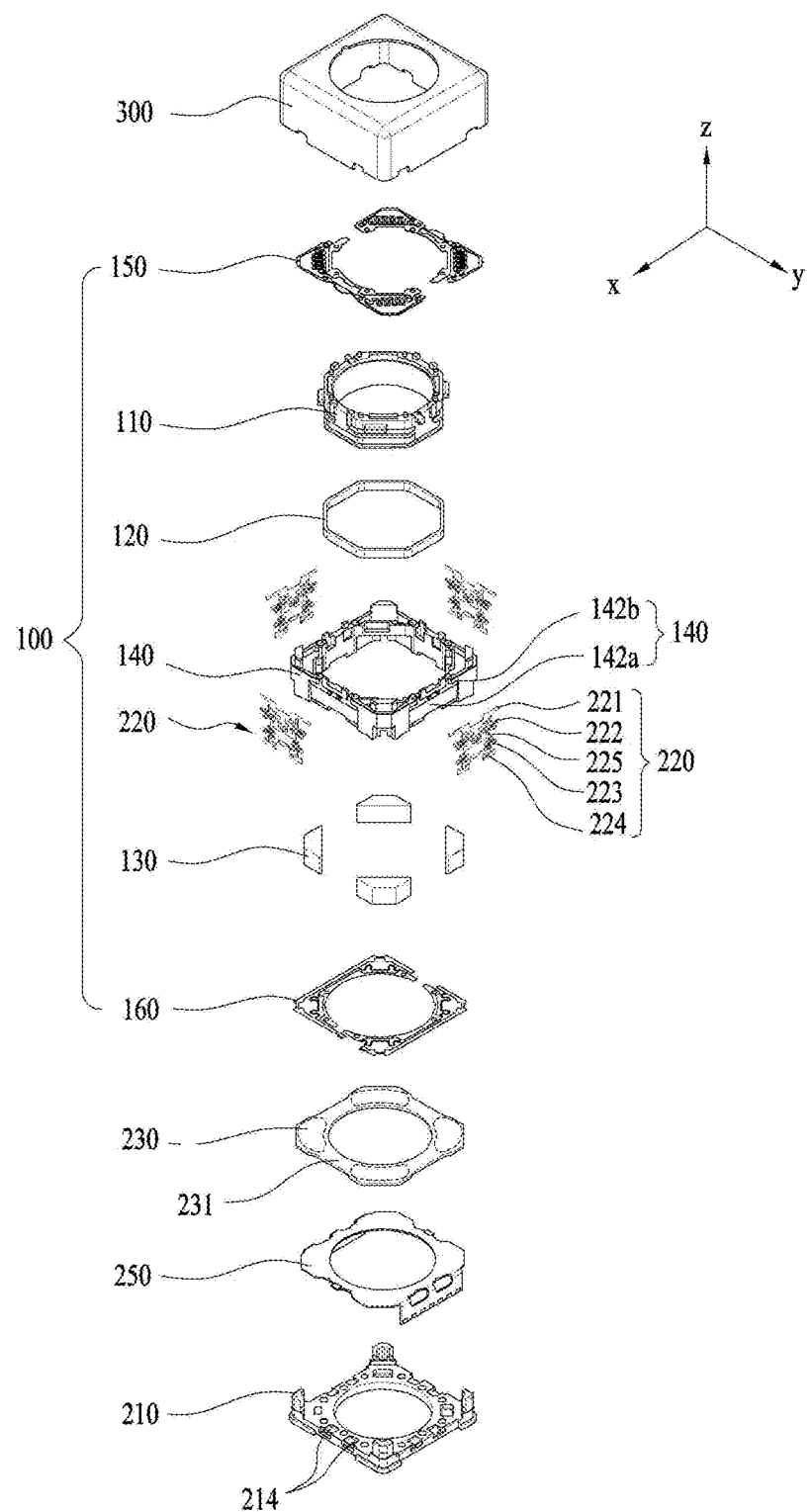
FIG. 2 is an exploded perspective view showing the lens moving apparatus according to the embodiment.
Figure 3:
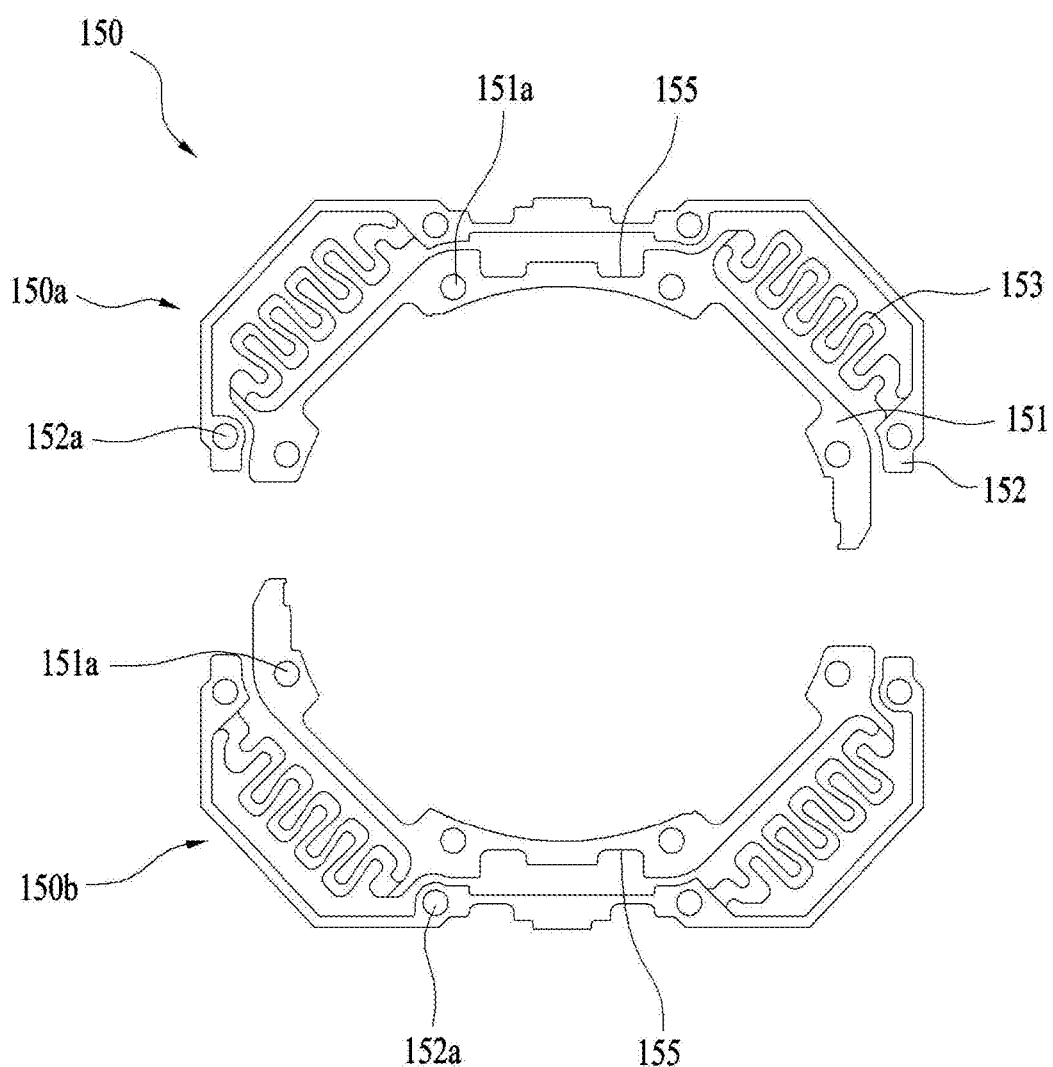
FIG. 3 is a plan view showing an upper elastic member according to the embodiment.
Figure 4:
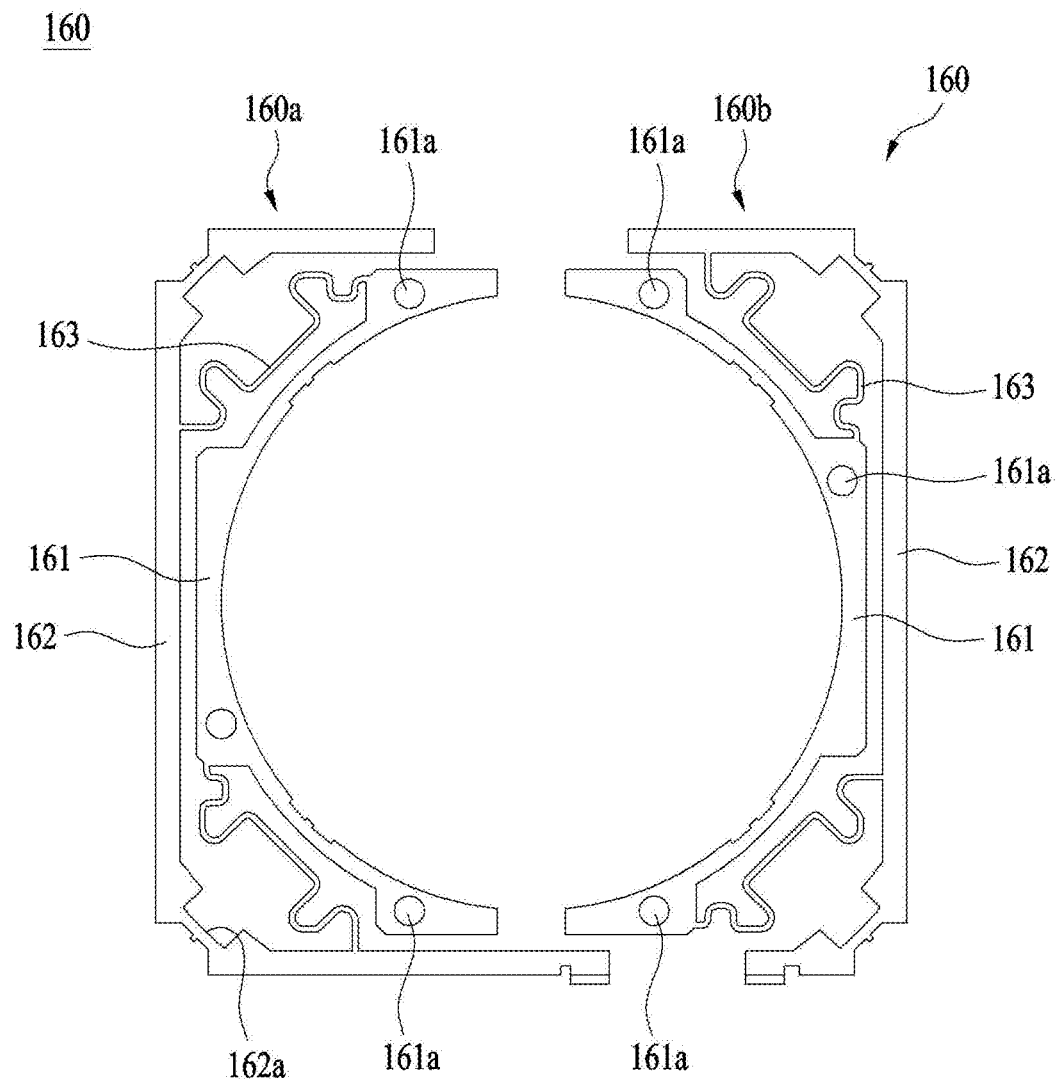
FIG. 4 is a plan view showing a lower elastic member according to the embodiment.
Figure 5:
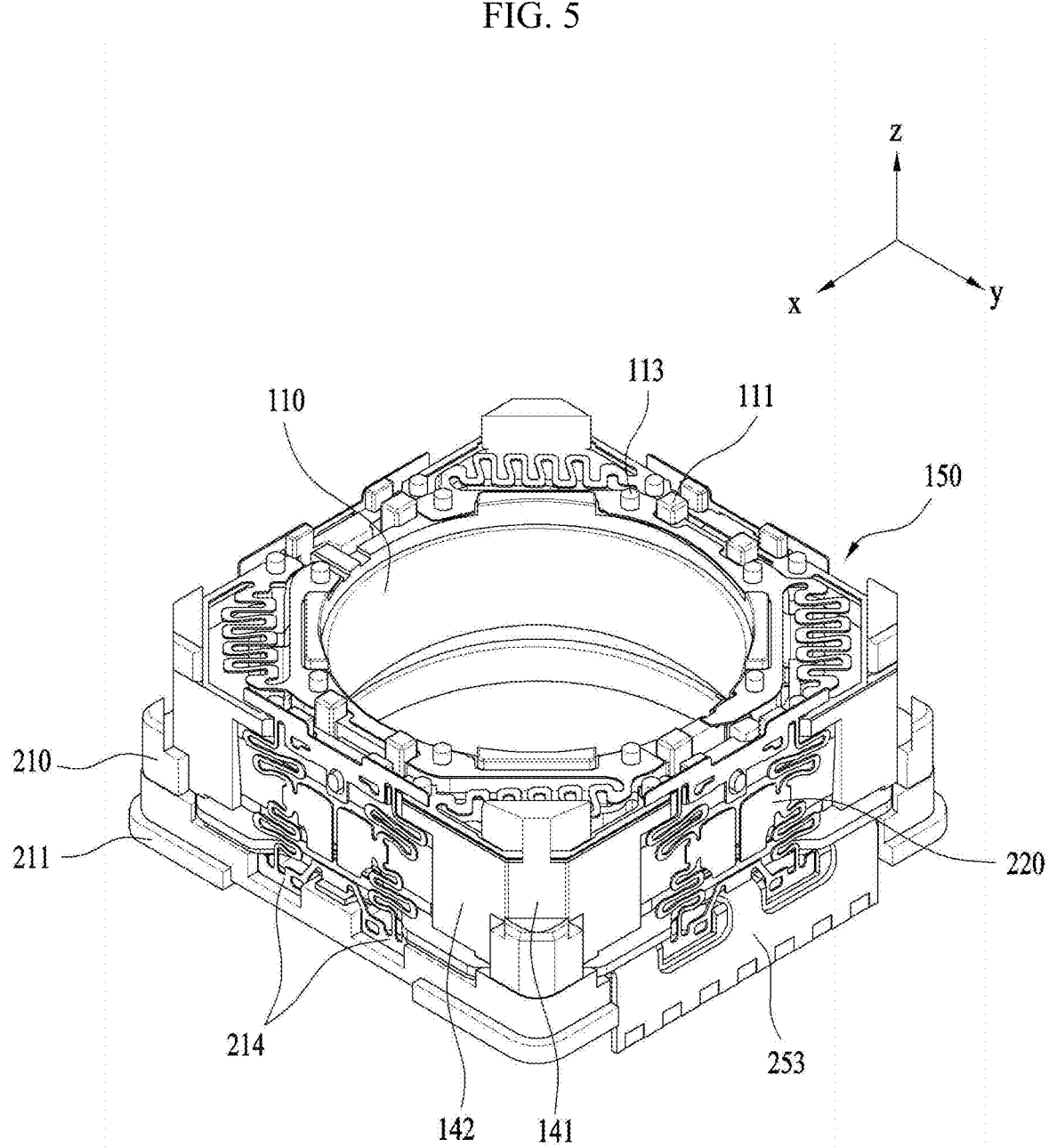
FIG. 5 is a view showing the lens moving apparatus shown in FIG. 1, from which a cover member has been removed.

FIG. 1 is a schematic perspective view showing a lens moving apparatus according to an embodiment. FIG. 2 is an exploded perspective view showing the lens moving apparatus according to the embodiment. FIG. 3 is a plan view showing an upper elastic member 150 according to the embodiment. FIG. 4 is a plan view showing a lower elastic member 160 according to the embodiment. FIG. 5 is a view showing the lens moving apparatus shown in FIG. 1, from which a cover member 300 has been removed.

A handshake correction apparatus, which is applied to compact camera modules of mobile devices such as smart phones or tablet PCs, refers to an apparatus configured to prevent the contour of an image captured when taking a still picture from not being clearly formed due to vibration caused by user handshake. In addition, an autofocusing apparatus is configured to automatically focus the subject image on the surface of an image sensor (not shown). The handshake correction apparatus and the autofocusing apparatus may be configured in various manners. In this embodiment, the handshake correction and/or autofocusing operations may be performed in such a manner as to move an optical module composed of a plurality of lenses in a first direction or in a plane perpendicular to a first direction.

As shown in FIGS. 1 and 2, the lens moving apparatus according to the embodiment may include a movable unit 100. The movable unit 100 may fulfill the functions of autofocusing and handshake correction of a lens.

As shown in FIG. 2, the movable unit 100 may include a bobbin 110, a first coil 120, a first magnet 130, a housing 140, an upper elastic member 150 and a lower elastic member 160.

The bobbin 110 may be provided on the outer surface thereof with the first coil 120 disposed in the first magnet 130, and thus the bobbin 110 may be installed in a space inside the housing 140 so as to be reciprocated in a first direction by the electromagnetic interaction between the first magnet 130 and the first coil 120. Since the bobbin 110 is provided at the outer surface thereof with the first coil 120, the electromagnetic interaction may occur between the first coil 120 and the first magnet 130.

The bobbin 110 may be elastically supported by upper and lower elastic members 150 and 160 such that the autofocusing function is fulfilled by the movement of the bobbin 110 in the first direction.

The bobbin 110 may include a lens barrel (not shown) including at least one lens installed therein. The lens barrel may be installed in the bobbin 110 in various manners.

For example, the lens barrel may be coupled to the bobbin 110 in such a manner that a female threaded portion is formed on an inner surface of the bobbin 110 and a male threaded portion, corresponding to the female threaded portion, is formed on the outer surface of the lens barrel to engage therewith. However, the disclosure is not limited thereto, and the lens barrel may be directly installed in the bobbin 110 by ways other than the threaded engagement by formation of the threaded portion on the inner surface of the bobbin 110. Alternatively, at least one lens may also be integrally formed with the bobbin 110 without the lens barrel.

The lens coupled to the lens barrel may be composed of a single lens, or may be composed of two or more lenses constituting an optical system.

An autofocusing function may be controlled by the direction of electric current, and may be fulfilled by moving the bobbin 110 in the first direction.

For example, the bobbin 110 may move upward from its initial position upon the application of forward current, whereas the bobbin 110 may move downward from its initial position upon the application of reverse current. In addition, the moving distance of the bobbin 110 from its initial position in one direction may be increased or decreased by controlling the amount of current flowing in the one direction.

The bobbin 110 may be provided at upper and lower surfaces thereof with an upper support protrusion 113 (see FIG. 5) and a lower support protrusion (not shown). The upper support protrusion 113 may be configured to have a cylindrical shape or a polygonal column shape such that the inner frame 151 of the upper elastic member 150 is coupled and secured to the bobbin 110.

According to this embodiment, the inner frame 151 may have a first through hole 151*a* formed at a position corresponding to the upper support protrusion 113.

The upper support protrusion 113 may be inserted in the first through hole 151*a* and may be secured thereto by means of thermal fusion or an adhesive material such as epoxy. The upper support protrusion 113 may include a plurality of upper support protrusions. The distance between the respective upper support protrusions 113 may be appropriately determined within the range within which interference with peripheral components can be avoided.

Specifically, the upper support protrusions 113 may be symmetrically arranged at a constant interval around the center of the bobbin 110, or may be arranged at irregular intervals so as to be symmetrical with respect to a specific imaginary line extending through the center of the bobbin 110.

The lower support protrusion may be configured to have a cylindrical shape or a polygonal column shape, similarly to the upper support protrusion 113, such that the inner frame 161 of the lower elastic member 160 is coupled and secured to the bobbin 110.

According to the embodiment, the inner frame 161 may have a third through hole 161*a* formed at a position corresponding to the lower support protrusion. The lower support protrusion may be inserted into the third through hole 161*a* and may be secured thereinto by means of thermal fusion or an adhesive material such as epoxy.

The distance between the respective lower support protrusions may be appropriately determined within the range within which interference with peripheral components can be avoided. In other words, the lower support protrusions may be symmetrically arranged at a constant interval around the center of the bobbin 110.

As shown in FIGS. 3 and 4, the upper elastic member 150 and the lower elastic member 160 may elastically support the upward and/or downward movement of the bobbin 110 in the first direction. The upper elastic member 150 and the lower elastic member 160 may be constituted by leaf springs.

The upper elastic member 150, which is disposed over the bobbin 110, may be configured such that the inner frame 151 is coupled to the bobbin 110 and the outer frame 152 is coupled to the housing 140. The lower elastic member 160, which is disposed under the bobbin 110, may be configured such that the inner frame 161 is coupled to the bobbin 110 and the outer frame 162 is coupled to the housing 140.

The upper elastic member 150 and the lower elastic member 160*s* may include the inner frames 151 and 161 coupled to the bobbin 110, the outer frames 152 and 162 coupled to the housing 140, and the connecting members 153 and 163 connected between the inner frames 151 and 161 and the outer frames 152 and 162, respectively.

The connecting members 153 and 163 may be bent at least once to form a predetermined pattern. By virtue of positional change and fine deformation of the connecting members 153 and 163, the upward and/or downward movement of the bobbin 110 in the first direction may be elastically supported.

According to the embodiment, the upper elastic member 150 has a plurality of second through holes 152*a* formed in the outer frame 152 and a plurality of first through holes 151*a* formed in the inner frame 151, as shown in FIG. 3.

The second through holes 152*a* may be fitted over the upper frame support protrusions 144 (see FIG. 10) provided on the upper surface of the housing 140, and the first through holes 151*a* or recesses may be fitted over the upper support protrusions 113 (see FIG. 6) provided on the upper surface of the bobbin 110. In other words, the outer frame 152 may be fixedly coupled to the housing 140 through the second through holes 152*a*, and the inner frame 151 may be fixedly coupled to the bobbin 110 through the first through holes 151*a* or recesses.

The connecting member 153 may connect the inner frame 151 to the outer frame 152 such that the inner frame 151 is elastically deformable with respect to the outer frame 152 within a predetermined range in the first direction.

At least one of the inner frame 151 and the outer frame 152 of the upper elastic member 150 may be provided with at least one terminal conductively connected to at least one of the first coil 120 of the bobbin 110 and the printed circuit board 250.

As shown in FIG. 4, the lower elastic member 160 has a plurality of fourth through holes 162*a* or recesses formed in the outer frame 162 and a plurality of third through holes 161*a* or recesses formed in the inner frame 161. The lower elastic member 160 can include a first upper elastic member 160*a* and a second upper elastic member 160*b*, which are seperated from each other.

The fourth through holes 162*a* or recesses may be fitted over the lower frame support protrusions 145, and the third through holes 161*a* or recesses may be fitted over the lower support protrusions provided on the lower surface of the bobbin 110.

In other words, the outer frame 162 may be fixedly coupled to the housing 140 through the fourth through holes 162*a* or recesses, and the inner frame 161 may be fixedly coupled to the bobbin 110 through the third through holes 161*a* or recesses.

The connecting members 163 may connect the inner frame 161 to the outer frame 162 such that the inner frame 161 is elastically deformable with respect to the outer frame 162 in the first direction within a predetermined range.

As shown in FIG. 3, the upper elastic member 150 may include a first upper elastic member 150a and a second upper elastic member 150b, which are separated from each other. Thanks to the dual partitioning structure, current having different polarities or different electric powers may be applied to the first upper elastic member 150a and the second upper elastic member 150b of the upper elastic member 150.

Specifically, the inner frame 151 and the outer frame 152 are coupled to the bobbin 110 and the housing 140, respectively, and then solder portions are provided at positions corresponding to opposite ends of the first coil 120 disposed at the bobbin 110. Subsequently, conductive connections such as solder are provided at the solder portions, whereby current having different polarities or different electric powers may be applied to the first upper elastic member 150a and the second upper elastic member 150b.

In addition, the first upper elastic member 150a is conductively connected to one of opposite ends of the first coil 120, and the second upper elastic member 150b is conductively connected to the second upper elastic member 150b, thus enabling external current and/or voltage to be applied thereto.

The upper elastic member 150 and the lower elastic member 160 may be assembled to the bobbin 110 and the housing 140 through a bonding process by means of thermal fusion and/or adhesive. In some cases, the assembly operation comprises thermal fusion and then bonding by adhesive, performed in that order.

In a modification thereof, the lower elastic member 160 may be configured to have a dual partitioning structure, and the upper elastic member 150 may be configured as an integral structure.

At least one of the inner frame 161 and the outer frame 162 of the lower elastic member 160 may be conductively connected to at least one of the first coil 120 of the bobbin 110 and the printed circuit board 250. The printed circuit board 250 may include the at least one terminal member 253, which may be conductively connected to the elastic members 150 and 160.

The printed circuit board 250 may be coupled to the upper surface of the base 210. As shown in FIGS. 2 and 5, the printed circuit board 250 may have a through hole through which a support member mounting recess 214 is exposed.

The printed circuit board 250 may be provided with a surface on which the bent terminal member 253 is mounted. A plurality of terminals may be disposed on the surface on which the first terminal member 253 is mounted so as to supply electric power, supplied from the outside, to the first coil 120. The number of the terminals formed on the terminal member 253 may be increased or decreased in accordance with the components that are required to be controlled. The printed circuit board 250 may further include an additional bent surface and an additional terminal member.

The base 210 is disposed under the bobbin 110. As shown in FIGS. 2 and 5, the base 210 may be configured to have an approximately rectangular shape, and may be provided on a flat surface thereof with the support member 220 held thereto. The base 210 may be provided with stepped portions 211 to which an adhesive is applied in order to adhesively attach the cover member 300 thereto. The surface of the stepped portion 211 may contact one end of the cover member 300.

The base 210 may have a support recess, which is formed in the surface that faces the terminal member 253 of the printed circuit board 250 and has a size corresponding to the first terminal member 251. The support recess may be recessed from the outer surface of the base 210 by a predetermined depth such that the portion of the terminal member 253 that protrudes from the base 210 is eliminated or controlled to a desired amount.

The stepped portions 211 may guide the cover member 300, which is mounted on the base 210. The cover member 300 may be mounted on the base 210 such that an end of the cover member 300 engages with the base 210 in a surface-contact manner. The stepped portions 211 and the end of the cover member 300 may be adhesively attached to each other or sealed by means of, for example, an adhesive.

The base 210 may be provided at corners of an upper surface thereof with the support member mounting recess 214, in which the support member 220 is inserted. The support member mounting recess 214 may be provided with adhesive so as to securely hold the support member 220.

The end of the support member 220 may be inserted or disposed in the support member mounting recess 214, and may then be secured thereto by means of an adhesive or the like. The support member mounting recess 214 may include one or more support member mounting recesses formed in the flat surface at which the support member 220 is installed. The support member mounting recess 214 may have an approximately rectangular shape.

As shown in FIGS. 2 and 5, according to the embodiment, the support member mounting recesses 214 may be provided in the base 210 in such a manner that two support member mounting recesses 214 are provided in each flat surface. The number of support member mounting recesses 214 may be increased or decreased in accordance with the shape of the support member 220, and three or more support member mounting recesses 214 may be provided in each flat surface.

The cover member 300 may be configured to have an approximate box shape capable of accommodating the movable unit 100, the printed circuit board 250 and the base 210. As shown in FIG. 1 etc., the cover member 300 may have escaping portions or recesses formed in positions corresponding to the stepped portions 211 of the base 210, and, as such, adhesive and the like may be injected through the escaping portions or recesses.

At this point, the adhesive is set to have a low viscosity such that the adhesive injected through the escaping portions or recesses can infiltrate the contact areas between the stepped portions 211 and the end of the cover member 300. The adhesive applied to the escaping portions or recesses fills the gap between the mating surfaces of the cover member 300 and the base 210 through the escaping portions of recesses, thus enabling the cover member 300 to be sealingly coupled to the base 210.

Figure 6:
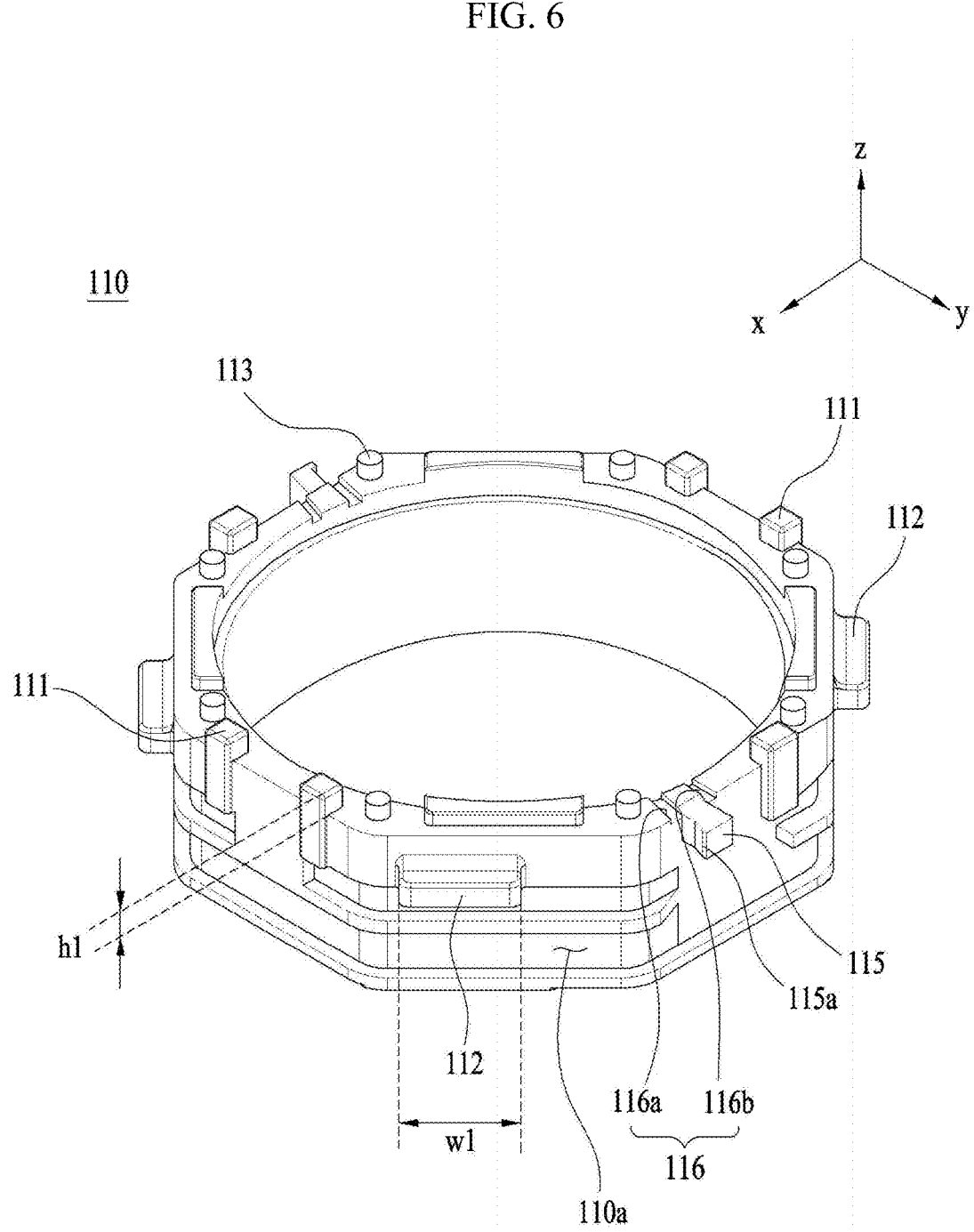
FIG. 6 is a perspective view of the bobbin according to one embodiment.

FIG. 6 is a perspective view of the bobbin 110 according to one embodiment. The bobbin 110 may include a first stopper 111 and/or a second stopper 112.

The first stopper 111 may prevent the upper surface of the bobbin 110 from directly colliding with the inner surface of the cover member 300 shown in FIG. 1 even when the bobbin 110 moves beyond the specified range due to external impact or the like in the course of moving in the first direction for the autofocusing function. Furthermore, the first stopper 111 may also serve to guide the installation position of the upper elastic member 150.

According to the embodiment, the first stopper 111 may include a plurality of stoppers which protrude upward by a first height h1, as shown in FIG. 6. Specifically, at least four first stoppers having a polygonal column shape may protrude. The first stoppers 111 may be configured to be symmetrical about the center of the bobbin 110, or may be configured to be asymmetrical, as shown in the drawing.

The second stopper 112 may prevent the lower surface of the bobbin 110 from directly colliding with the upper surfaces of the base 210 and the circuit board 250 shown in FIG. 2 even when the bobbin 110 moves beyond the specified range due to external impact or the like in the course of moving in the first direction for the autofocusing function.

According to the embodiment, the second stopper 112 may circumferentially protrude from the side surface of the upper portion of the corner of the bobbin 110, and the housing 140 may have a bobbin mounting seat 146 (see FIG. 10) formed at a position corresponding to the second stopper 112.

When the state in which the stopper 112 and the lower surface 146a of the bobbin mounting seat 146 (see FIG. 10) are in contact with each other is set be the initial position, the autofocusing function may be realized by unidirectional control in which the bobbin 110 is raised when current is supplied to the first coil 120 and is lowered when the supply of the current is halted.

If the state in which the stopper 112 is spaced apart from the lower surface 146a of the bobbin mounting seat 146 is set to be the initial position, the autofocusing function may also be realized by bidirectional control in which the bobbin 110 is moved upward or downward in the first direction depending on the direction of current. For example, the bobbin 110 may be moved upward upon the application of forward current and may be moved downward upon the application of reverse current.

Figure 10:
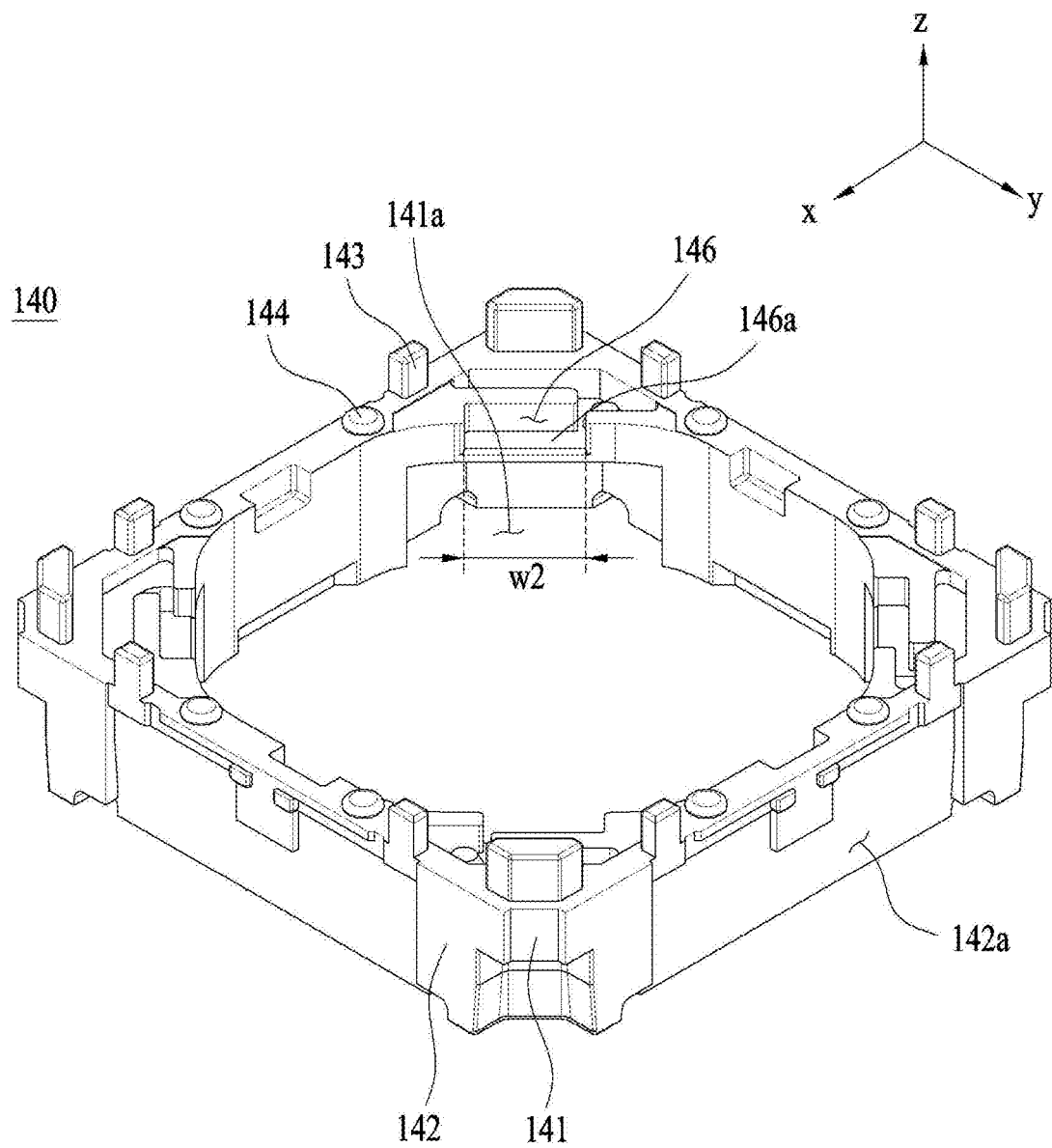
FIG. 10 is a perspective view showing a housing according to an embodiment.

The bobbin mounting seat 146 of the housing 140, which corresponds to the second stopper 112, is recessed. As shown in FIG. 10, the width w2 of the bobbin mounting seat 146 is configured to have a predetermined tolerance with respect to the first width w1 of the second stopper 112 so as to prevent the second stopper 112 from rotating in the bobbin mounting seat 146. Accordingly, the second stopper 112 may prevent rotation of the bobbin 110 even if the bobbin 110 is subjected to force that is applied in the direction of rotating about the z axis, rather than in the first direction.

The bobbin 110 may include two winding protrusions 115 formed on the outer surface of an upper portion thereof. The two ends, that is, the starting line and ending line of the first coil 120, may be wound around respective winding protrusions 115. The two ends of the first coil 120 may be conductively connected to the upper surface of the upper elastic member 150 at a position on the bobbin 110 close to the winding protrusions 115, by means of a conductive connecting member such as solder.

The winding protrusions 115 may include a pair of winding protrusions which are disposed at positions symmetrical about the center of the bobbin 110, or the pair of winding protrusions 115 may be disposed close to each other.

The winding protrusions 115 may be respectively provided at the ends thereof with retaining protrusions 115a so as to prevent the first coil 120 wound therearound from being separated therefrom or to guide the position of the first coil 120. The winding protrusions 115 may have a width that increases radially outward from the outer circumferential surface of the bobbin 110, and may be provided at the ends thereof with the stepped retaining protrusions 115a.

As shown in FIG. 6, the bobbin 110 may be provided with at least one groove 116 close to the winding protrusions 115. The groove 116 may include a first groove 116a and/or a second groove 116b. The first groove 116a and/or the second groove 116b may have a depth and width which are greater than the diameter of the first coil 120 such that the starting line or the ending line of the first coil 120 passes through the groove.

Accordingly, the starting line and the ending line of the first coil 120 may be easily received in the first and/or second grooves 116a and 116b. Furthermore, the starting line and the ending line of the first coil 120 may extend through the first and/or second grooves 116a and 116b without interference with the upper elastic member, which is disposed thereon.

Figure 7:
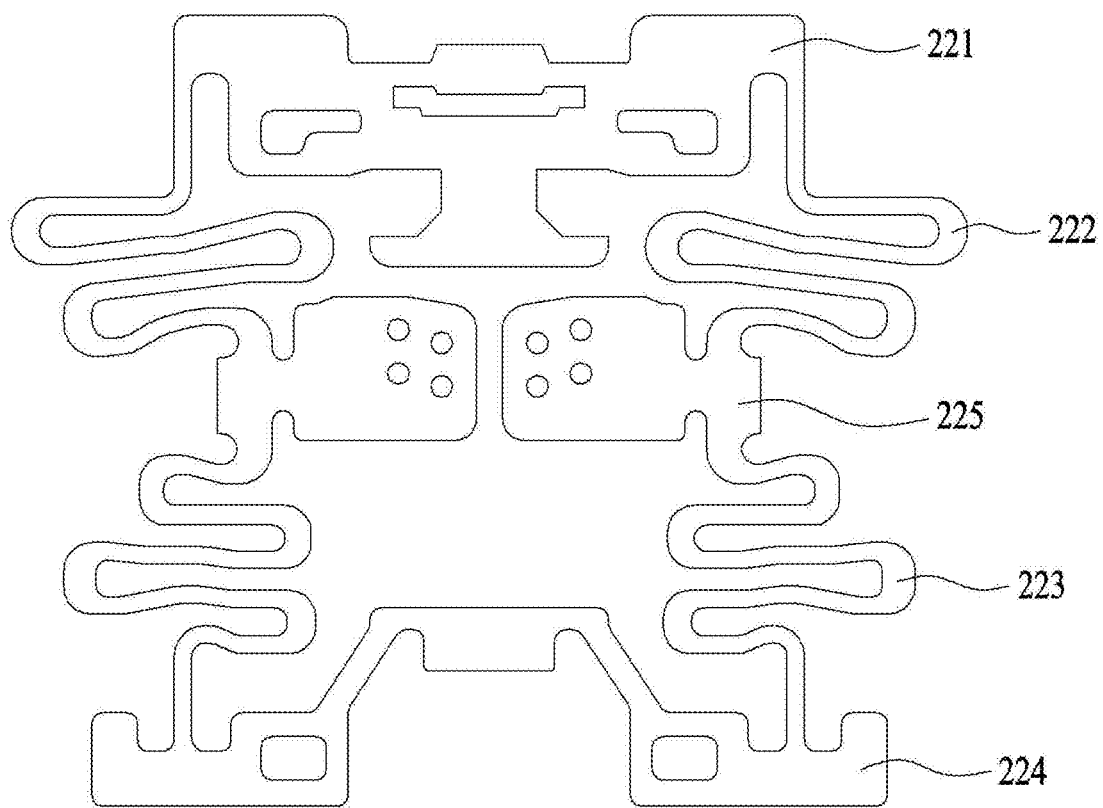
FIG. 7 is a front view showing a support member according to the embodiment.
Figure 8:
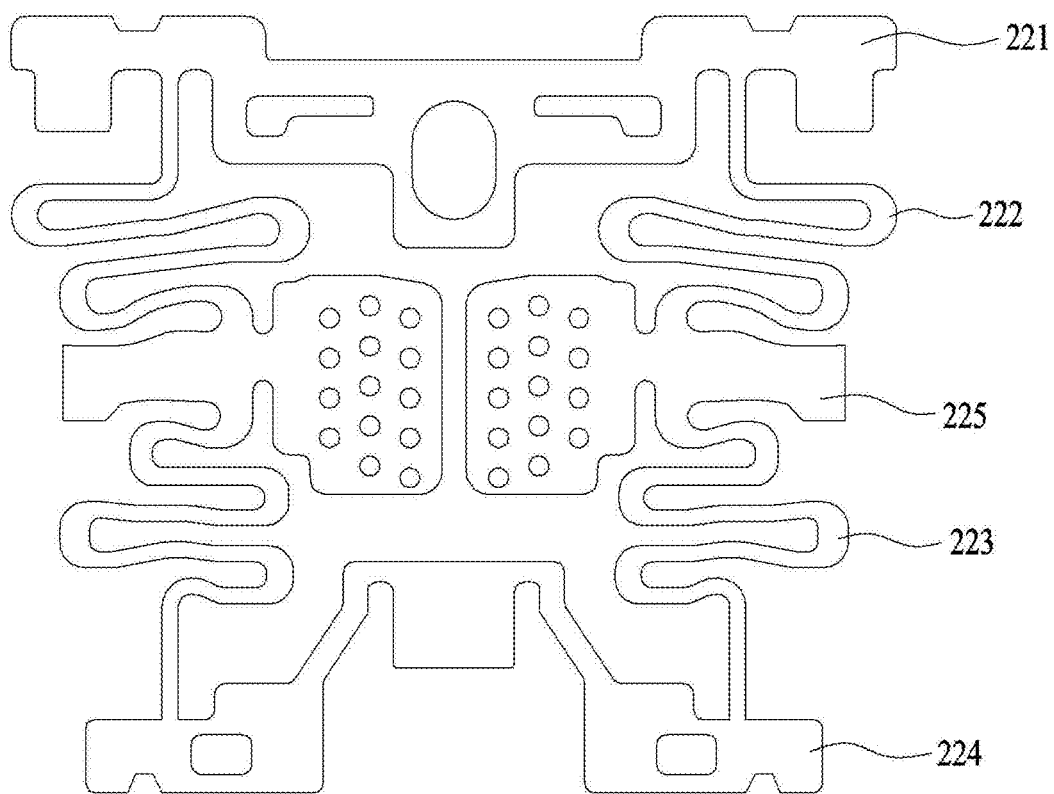
FIG. 8 is a front view showing a support member according to another embodiment.

FIG. 7 is a front view showing the support member 220 according to the embodiment. FIG. 8 is a front view showing a support member 220 according to another embodiment. FIG. 5 illustrates the support member 220 according to one embodiment, which is disposed at the normal position The support member 220 is disposed at one side surface of the housing 140. The support member 220 is coupled at an upper portion thereof to the housing 110 and is coupled at a lower portion thereof to the base 210. The support member 220 may support the bobbin 110 and the housing 140 such that the bobbin 110 and the housing 140 can be displaced in the second and third directions, which are perpendicular to the first direction. The support member 220 may be conductively connected to the first coil 120.

The support members 220 may be separately disposed on the second surfaces 142 of the housing 140 so as to support the housing 140 in the state of being spaced apart from the base 210 by a predetermined distance. One end of the support member 220 may be inserted or disposed in the support member mounting recess 214, and may then be coupled thereto using an adhesive material such as epoxy. The other end of the support member 220 may be secured to an upper end of the side wall of the housing 140.

Since the support member 220 is disposed on the second surfaces 142 of the housing 140, a total of four support members may be symmetrically disposed on respective side surfaces 142 one on each. However, the disclosure is not limited thereto, and a total of eight support members 220 may be provided, two on each flat surface. The support member 220 may be conductively connected to the upper elastic member 150 or to the flat surface of the upper elastic member 150.

Specifically, the support member 220 may include a first coupling portion 221, a second coupling portion 224, a first elastic deformation portion 222, a second elastic deformation portion 223 and a connecting portion 225.

The first coupling portion 221 is the portion of the support member 220 that is coupled to the upper end of the second surface 142 of the housing 140. The first coupling portion 221 may include through holes at locations corresponding to the protrusions protruding from the second surface 142 of the housing 140 such that the coupling portion 221 is coupled to the upper end of the housing 140 by fitting the protrusions into the through holes.

Since the support member 220 is constructed separately from the upper elastic member 150, the support member 220 and the upper elastic member 150 may be conductively connected to each other by means of conductive adhesive, solder, welding or the like. Accordingly, the upper elastic member 150 may apply current to the first coil 120 through the support member 220, which is conductively connected thereto.

The second coupling portion 224 may be the portion that is coupled to the base 210, and may be provided at the end of the support member 220. Although the second coupling portion 224 may be configured as a plate having a greater width than that of the first and second elastic deformation portions 222 and 223, the second coupling portion 224 may have a width equal to or smaller than the width of the first and second elastic deformation portions 222 and 223, without being limited thereto.

Figure 9:
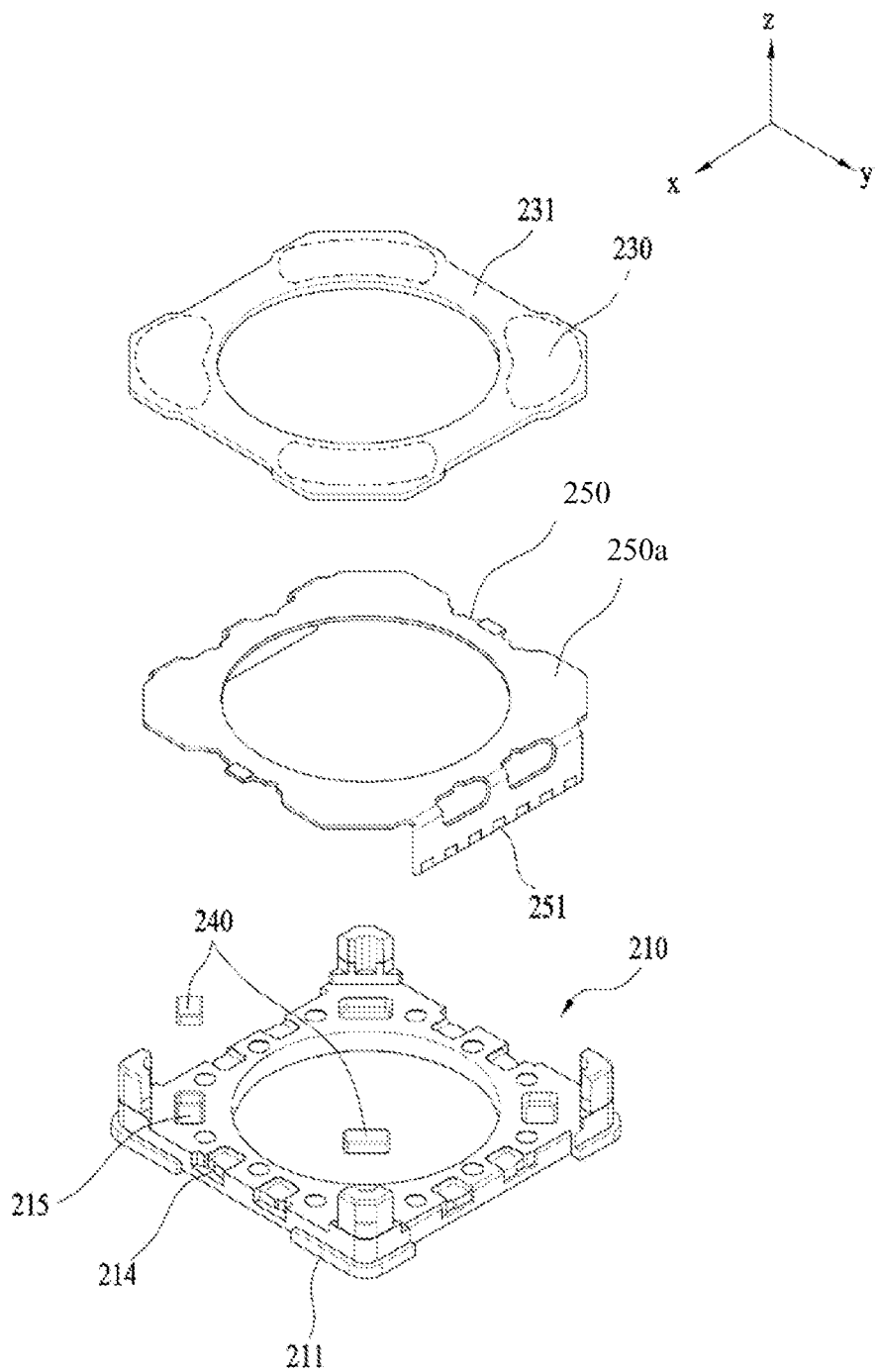
FIG. 9 is an exploded perspective view showing a base, a printed circuit board and a second coil according to an embodiment.

According to the embodiment, the second coupling portion 224 may be divided into two elements, and may be inserted or disposed in the support member mounting recess 214, as shown in FIGS. 8 and 9. The second coupling portion 224 may be securely coupled to the support member mounting recess 214 of the base 210 by means of an adhesive material such as epoxy.

However, the disclosure is not limited thereto, and the support member mounting recess 214 may be configured to correspond to the second coupling portion 224 and may be fitted in the second coupling portion 224. The second coupling portion 224 may include a single second coupling portion or two or more second coupling portions. The support member mounting recess 214 may be formed in the base 210 in accordance with the number of second coupling portion 224.

The elastic deformation portions 222 and 223 may be bent at least once to provide a determined pattern. According to the embodiment, the elastic deformation portions may include first and/or second elastic deformation portions 222, 223. The first elastic deformation portion 222 extends from the first coupling portion 221 and may be connected to the connecting portion 225. The second elastic deformation portions 223 may extend from the second coupling portion 224, and may be connected to the connecting portion 225.

The elastic deformation portions 222 and 223 may be positioned with the connecting portion 225 disposed therebetween, and may be configured to have a symmetrical shape. As shown in FIGS. 7 and 8, when the first elastic deformation portion 222 is configured as two or more bent portions in a zigzag manner, the second elastic deformation portion 223 may also be correspondingly configured. However, the disclosure is not limited thereto, and the first elastic deformation portion 222 may be provided alone, or the second elastic deformation portion 223 may be configured so as to have some other structure.

The above configuration is merely an example, and the embodiment may be configured to have various patterns, such as a zigzag pattern. In this case, only one elastic deformation portion may be provided, without being divided into the first and second elastic deformation portions 222 and 223, and the elastic deformation portion may be configured to have a suspension wire shape, rather than the above pattern.

According to the embodiment, straight portions of the first and second elastic deformation portions 222 and 223 may be approximately parallel to a plane that is perpendicular to the first direction.

When the housing 140 moves in the second and/or third directions, which are perpendicular to the first direction, the elastic deformation portions 222 and 223 may be elastically and finely deformed in the moving direction of the housing 140 or in the longitudinal direction of the support member 220.

As a result, since the housing 140 may move in the second and third directions with almost no displacement in the first direction, the accuracy of handshake correction may be improved. This utilizes the property of the first and second elastic deformation portions 222 and 223, which are capable of extending in a longitudinal direction. The term "longitudinal direction" may refer to the connecting direction between first and second coupling portions 221 and 224.

The connecting portion 225 may include a pair of connecting portions, which are disposed to be symmetrical to each other and connect the first and second elastic deformation portions 222 and 223. Although the connecting portion 225 may be disposed between the first and second elastic deformation portions 222 and 223, as described above, the disclosure is not limited thereto. The connecting portion 225 may also be connected to one elastic deformation portion.

Although one support member 220 is provided with a pair of first and second elastic deformation portions 222 and 223 in the embodiment, the first and second coupling portions 221 and 224 may be integrally constructed, and the pair of first and second elastic deformation portions 222 and 223 may be coupled to the housing 140 and the base 210 at the same time.

FIG. 9 is an exploded perspective view showing the base 210, the printed circuit board 250 and a second coil 230 according to an embodiment. The lens moving apparatus may further include the second coil 230 and a detection sensor 240.

The second coil 230 may perform handshake correction by moving the housing 140 in the second and/or third directions by electromagnetic interaction with the first magnet 130. Accordingly, there is a need to mount the first magnet 130 at a position corresponding to the second coil 230.

The second coil 230 may be disposed so as to face the first magnet 130 secured to the housing 140. By way of example, the second coil 230 may be disposed outside the first magnet 130, or may be disposed under the first magnet 130, with a predetermined distance therebetween.

According to the embodiment, although a total of four second coils 230 may be respectively disposed on the four corners of the printed circuit board 250, the disclosure is not limited thereto. Only one second coil for movement in the second direction and one second coil for movement in the third direction may be disposed, or four or more second coils may be disposed.

In this embodiment, although a circuit pattern having the shape of the second coil 230 may be formed on the printed circuit board 250 and an additional second coil 230 may be disposed over the printed circuit board 250, the disclosure is not limited thereto. Alternatively, only an additional second coil 230 may be disposed over the printed circuit board 250, without forming a circuit pattern having the shape of the second coil 230 on the printed circuit board 250.

Furthermore, the second coil 230, which has been prepared by winding a wire into a doughnut shape or which has the shape of a finely patterned coil, may be conductively connected to the printed circuit board 250.

A circuit member 231 including the second coil 230 may be disposed on the upper surface 250a of the printed circuit board 250 that is positioned over the base 210. However, the disclosure is not limited thereto, and the second coil 230 may be disposed on the base 210 in a state of being in close contact therewith, or may be spaced apart from the base 210 by a predetermined distance. In other examples, a substrate on which the second coil is formed may be layered on the printed circuit board 250 and connected thereto.

The detection sensor 240 is positioned at the center of the second coil 230 so as to detect the movement of the housing 140. The detection sensor may fundamentally serve to detect movement of the housing 140 in the first direction, and in some case may serve to detect movement of the housing 140 in the second and/or third directions.

The detection sensor 240 may be constituted by a Hall sensor, but may by constituted by any sensor as long as the sensor is able to detect variation of magnetic force. As shown in FIG. 9, the detection sensor 240 may include two detection sensors, which are mounted on the corners of the base 210 positioned under the printed circuit board 250. The mounted detection sensors 240 may be received in sensor mounting recesses 215 formed in the base 210. The lower surface of the printed circuit board 250 may be the surface opposite the surface on which the second coil 230 is disposed.

The detection sensor 240 may be disposed under the second coil 230 with the printed circuit board 250 disposed therebetween such that the detection sensor 240 is spaced apart from the second coil 230 by a predetermined distance. In other words, the detection sensor 240 is not directly connected to the second coil 230, and the printed circuit board 250 may be provided on the upper surface thereof with the second coil 230 and on the lower surface thereof with the detection sensor 240.

Figure 11:
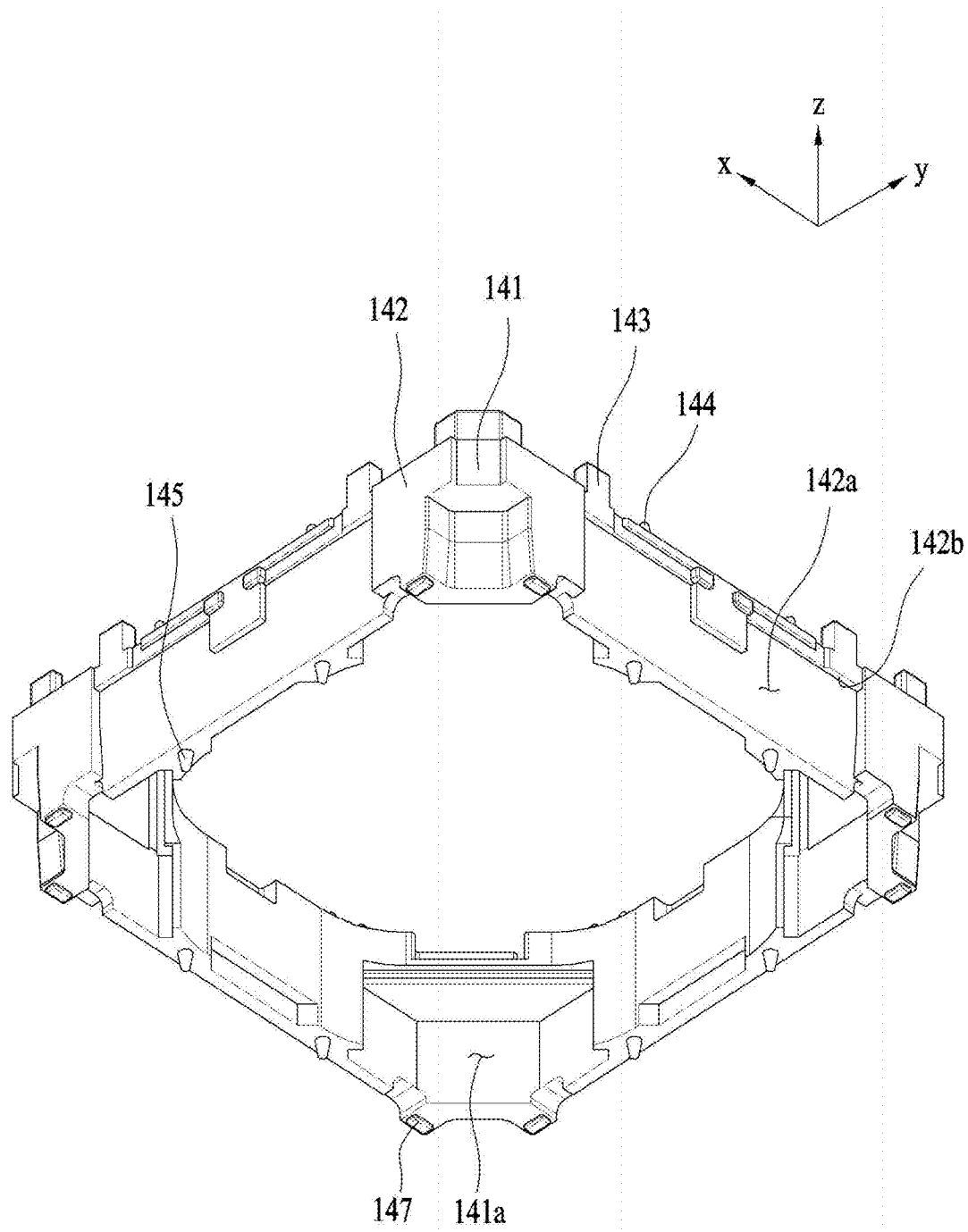
FIG. 11 is a bottom perspective view showing the housing according to the embodiment.

FIG. 10 is a perspective view showing the housing 140 according to an embodiment. FIG. 11 is a bottom perspective view showing the housing 140 according to the embodiment.

The housing 140 may be configured to have a hollow column shape supporting the first magnet 130. According to the embodiment, the housing 140 may have an approximately octagonal shape, as shown in FIGS. 10 and 11. The housing 140 may include a first side surface 141 and a second side surface 142. The first magnet 130 may be mounted on the first side surface 141, and the support member 220 may be disposed on the second side surface 142.

The first side surface 141 may be positioned at the corner of the housing 140. According to the embodiment, the first side surface 141 may be configured to have a surface area equal to or larger than that of the first magnet 130. The first magnet 130 may be secured in a first magnet mounting seat 141a formed in the inner surface of the first side surface 141.

The first magnet mounting seat 141a may be constituted by a recess having a size corresponding to the size of the first magnet 130, and may face at least three surfaces of the first magnet 130, that is, both lateral surfaces and the upper surface of the first magnet 130.

Although the first magnet 130 may be secured to the first magnet mounting seat 141a by means of an adhesive, the disclosure is not limited thereto, and double-sided adhesive tape or the like may be alternatively be used. Furthermore, the first magnet mounting seat 141a may not be constituted by the recess shown in FIG. 4, but may be configured to have a mounting hole in which the first magnet 130 is partially fitted or exposed.

The housing 140 may be provided on the upper surface thereof with a plurality of third stoppers 143. The third stoppers 143 may restrict the upward movement of the housing 140.

The third stoppers 143 may also serve to guide the installation position of the upper elastic member 150. To this end, the upper elastic member 150 may be provided at positions corresponding to the third stopper 143 with guide holes 155 having a shape corresponding to the third stopper 143, as shown in FIG. 3.

Although the first side surface 141 may be disposed parallel to the side surface of the cover member 300, the disclosure is not limited thereto, and the first side surface 141 may be configured to have a larger surface area than the second side surface 142.

As shown in FIGS. 10 and 11, the second side surface 142 may be recessed to define a reception recess 142a having a predetermined depth. According to the embodiment, the lower surface of the reception recess 142 may be open, and both the upper and lower surfaces of the reception recess 142 may be open.

Thanks to the provision of the reception recess 142a, spatial interference between the connecting members 153 and 163 and the bobbin 110 is eliminated when the bobbin 110 moves with respect to the housing 140 in the first direction, thus allowing the connecting members 153 and 163 to be easily elastically deformed.

The lower open end of the reception recess 142a may prevent the second coupling portion 224 of the support member 220 from interfering with the housing 140. As shown in FIG. 11, the reception recess 142a may be provided at the upper end thereof with a stepped portion 142b so as to partially support the upper portion of the support member 220.

Although the reception recess 142a may be positioned at the lateral side of the housing 140 as in the embodiment, the reception recess 142a may alternatively be positioned at the corner of the housing 140 depending on the shape and/or position of the connecting members 153 and 163 of the elastic members 150 and 160 and the support member 220.

The housing 140 may be provided at the upper surface thereof with a plurality of upper frame support protrusions 144 to which the outer frame 152 of the upper elastic member 150 is coupled. The number of upper frame support protrusions 144 may be greater than the number of upper support protrusions 113. This is because the length of the outer frame 152 is longer than the length of the inner frame 151.

The outer frame 152 may have second through holes 152a which are formed at positions corresponding to the upper frame support protrusions 144, and may have a shape corresponding to the upper support protrusions 144. The upper frame support protrusions 144 may be fixed in the second through holes 152a by means of an adhesive or thermal fusion.

As shown in FIG. 11, the housing 140 may be provided at a lower surface thereof with a plurality of lower frame support protrusions 145 to which the outer frame 162 of the lower elastic member 160 is coupled. The lower frame support protrusions 145 may be more numerous than the lower support protrusions because the outer frame 162 of the lower elastic member 160 is longer than the inner frame 161.

The outer frame 162 may have fourth through holes 162a, which are formed at positions corresponding to the lower frame support protrusions 145 and have a shape corresponding to that of the lower frame support protrusions 145. The lower frame support protrusions 145 may be fixed in the fourth through holes 162a by means of an adhesive or thermal fusion.

The housing 140 may further be provided at a lower surface thereof with fourth stoppers 147. The fourth stoppers 147 may serve to restrict the downward moving distance of the housing 140. Therefore, the fourth stoppers 147 may prevent the bottom surface of the housing 140 from colliding with a base 210 and/or a printed circuit board 250.

The fourth stoppers 147 may be maintained in the state of being spaced a predetermined distance apart from the base 210 and/or the printed circuit board 250 during an initial stage or during normal operation. By virtue of this construction, the housing 140 may be spaced apart not only from the base 210 disposed thereunder but also from the cover member 300 disposed thereover, and, as such, the housing 140 may be maintained at a constant level in the first direction without interference from obstacles above and below. Accordingly, the housing 140 may perform a shifting action in second and third directions, perpendicular to the first direction.

Figure 12:
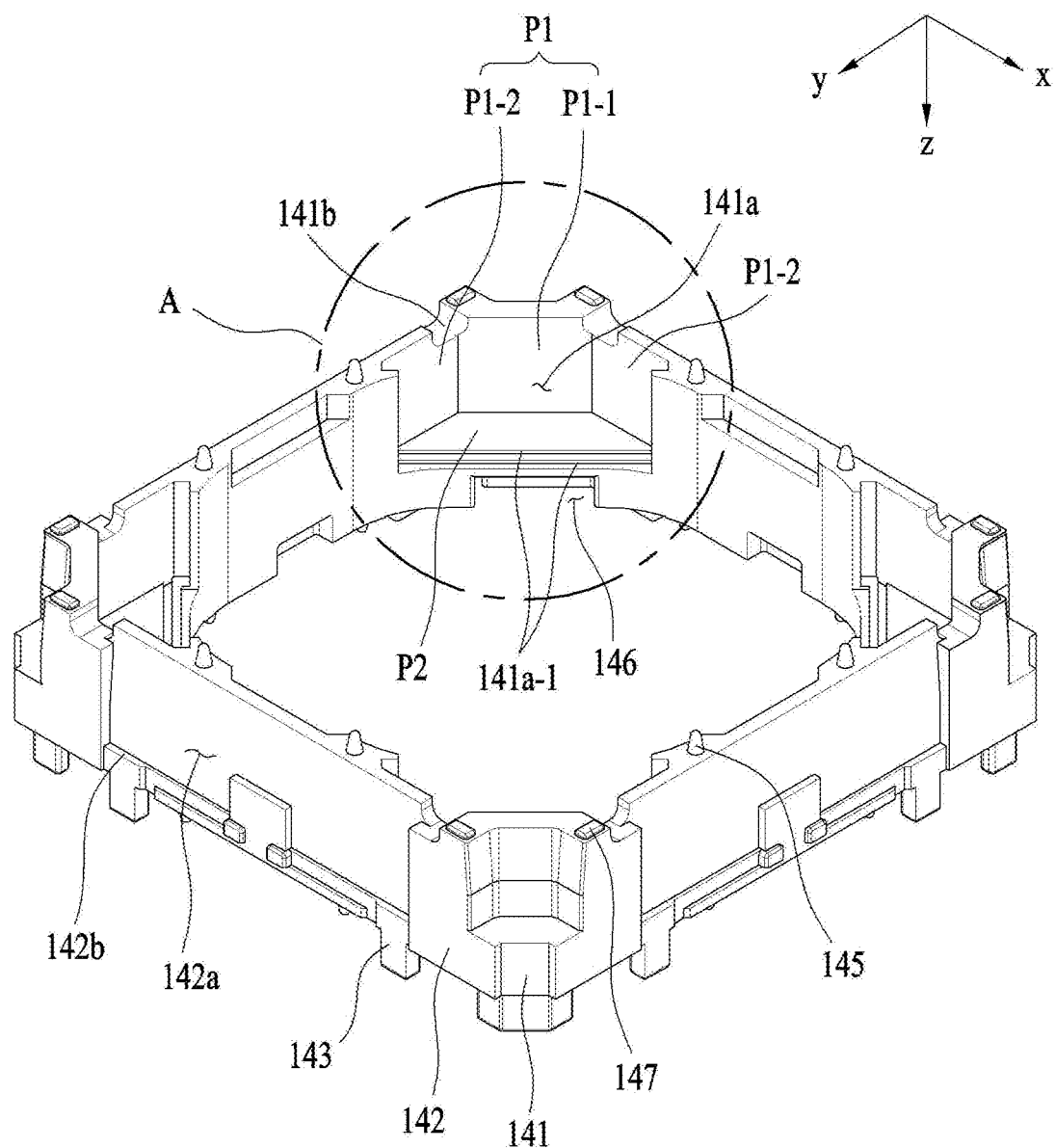
FIG. 12 is a view of the housing in which the z-axis direction shown in FIG. 11 is rotated by 180°.

FIG. 12 is a view of the housing in which the z-axis direction shown in FIG. 11 is rotated by 180°. When the first magnet 130 is coupled to the first magnet mounting seat 141a using an adhesive g, the housing 140 may be installed on a working table such that the z-axis direction is directed downward, unlike the disposition shown in FIGS. 1 and 2, and the coupling operation may be performed. Since the object of the embodiment is to solve the problems occurring in the case where an insufficient or excessive amount of adhesive g is applied to the first magnet mounting seat 141a, in order to clearly explain the related structures, figures in which the first direction is directed downward are illustrated in FIG. 12 and subsequent drawings.

As shown in FIG. 12, the housing 140 may have adhesive inlets which are formed between the outer surface of the housing 140 and the side surface P1 of the first magnet mounting seat 141a. In other words, the housing 140 may have adhesive inlets that are depressed from the lower surface of the housing 140 so as to allow the first magnet mounting seat 141a to communicate with the outside of the housing 140.

As shown in FIG. 12, the adhesive inlet 141b may be configured to have a recess which is formed by partially depressing the lower surface of the housing 140. However, this is merely one embodiment, and the adhesive inlet 141b may also be configured to have a hole shape which connects the outer surface of the housing 140 and the side surface P1 of the first magnet mounting seat 141a. In this case, the hole shape may be open at a portion of the inner surface thereof.

The adhesive inlet 141b is preferably is formed at a lower portion of the side surface P1 of the first magnet mounting seat 141a. Specifically, this is because, since the housing 140 is in an inverted state when the first magnet 130 is mounted on the first magnet mounting seat 141a, unlike the disposition shown in FIGS. 1 and 2, the adhesive g, which is introduced through the adhesive inlet 141b, flows toward the upper end from the lower end of the first magnet mounting seat 141a due to gravity.

Specifically, the first magnet 130 may be configured to have, for example, a trapezoidal shape when viewed in a plan view, and the first magnet mounting seat 141a, which is provided at the corner of the housing 140, may also be configured to have a trapezoidal shape when viewed in a plan view. Meanwhile, the side surface P1 of the first magnet mounting seat 141a may include a first side surface P1-1, which corresponds to the upper side of the trapezoid, and second side surfaces P1-2 connected to both side edges of the first side surface P1-1.

The adhesive inlet 141b may be formed between the first side surface P1-1 and/or the second side surface P1-2. The specific example of the magnetic inlet 141b will be described later.

In the procedure of mounting the first magnet 130 on the housing 140, the adhesive g is first applied to the side surface P1 and the upper surface P2 of the first magnet mounting seat 141a. At this time, it is difficult to uniformly apply an accurate quantity of adhesive g to the first magnet mounting seat 141a. This is because the viscosity of the adhesive g may vary depending on the kind of adhesive g, the temperature during the mounting operation, or the like.

Accordingly, when the quantity of adhesive g that is applied is small, the adhesive g may have an unsuitable viscosity and thus not uniformly spread, thus causing defective attachment of the first magnet 130. When a drop experiment for determining the reliability of products is performed under such a condition, defective products in which the first magnet 130 is separated from the housing 140 may be evident.

There is no way to determine whether a sufficient amount of adhesive G is uniformly applied once the first magnet 130 is attached to the housing 140. Accordingly, after the first magnet 130 is first attached to the housing 140, there is the need to inject additional adhesive g to the attaching area of the housing 140 in order to supply a sufficient amount of adhesive g to the attaching area, thus increasing the adhesive force between the first magnet 130 and the housing 140.

Accordingly, in order to supply the additional adhesive g to the attaching area after attaching the first magnet 130 to the housing 140, the adhesive inlet 141b may be formed.

At this point, when the adhesive g is injected through the adhesive inlet 141b using an injector n, the adhesive g discharged from the needle point of the injector may penetrate into the gap between the first magnet 130 and the first magnet mounting seat 141a, at which the adhesive g was not applied in the first application, thus increasing the bonding force between the first magnet 130 and the housing 140.

In the embodiment, the adhesive inlet 141b is formed so as to connect the outer surface of the housing 140 and the side surface P1 of the first magnet mounting seat 141a, and the adhesive g is additionally applied to the bonding area through the magnet inlet 141b so as to increase the bonding force between the first magnet 130 and the housing 140.

The upper surface P2 of the first magnet mounting seat 141a may be provided with at least one first flow restrictor 141a-1 for restricting the flow of the adhesive g. The first flow restrictor 141a-1 may be configured to have a groove parallel to the lower side of the trapezoid of the first magnet mounting seat 141a.

When an excessive amount of adhesive g is applied to the first magnet mounting seat 141a or when the viscosity of the adhesive g is decreased and its fluidity is thus increased due to the kind of the adhesive g, the temperature during the bonding procedure, or the like, even if a suitable amount of adhesive g is applied, the applied adhesive g may escape from the first magnet mounting seat 141a and flow down.

Since the adhesive g, which has escaped from the first magnet mounting seat 141a and has cured in another area of the lens moving apparatus, obstructs the movement of other components, it may cause operational malfunction or breakage of the lens moving apparatus. The portions that protrude differently from the original design due to the cured adhesive g may cause severe defections in the autofocusing or handshake correction of the lens moving apparatus.

In order to prevent the adhesive g from flowing down, the upper surface P2 of the first magnet mounting seat 141a may be provided with the first flow restrictor 141a-1. A second flow restrictor 146a-1 may further be provided.

Figure 13:
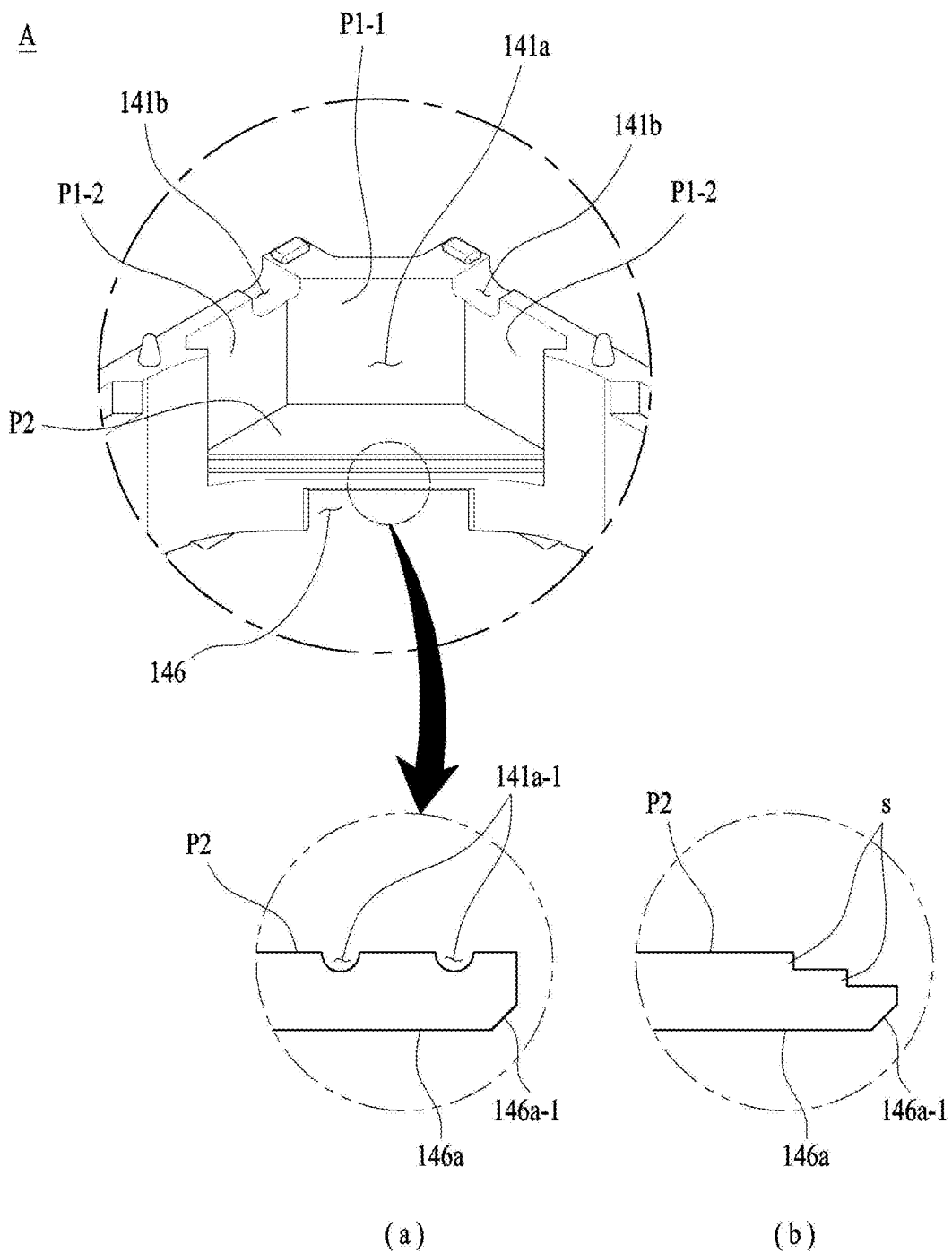
FIGS. 13 and 14 are enlarged views of circle A of FIG. 12.
Figure 14:
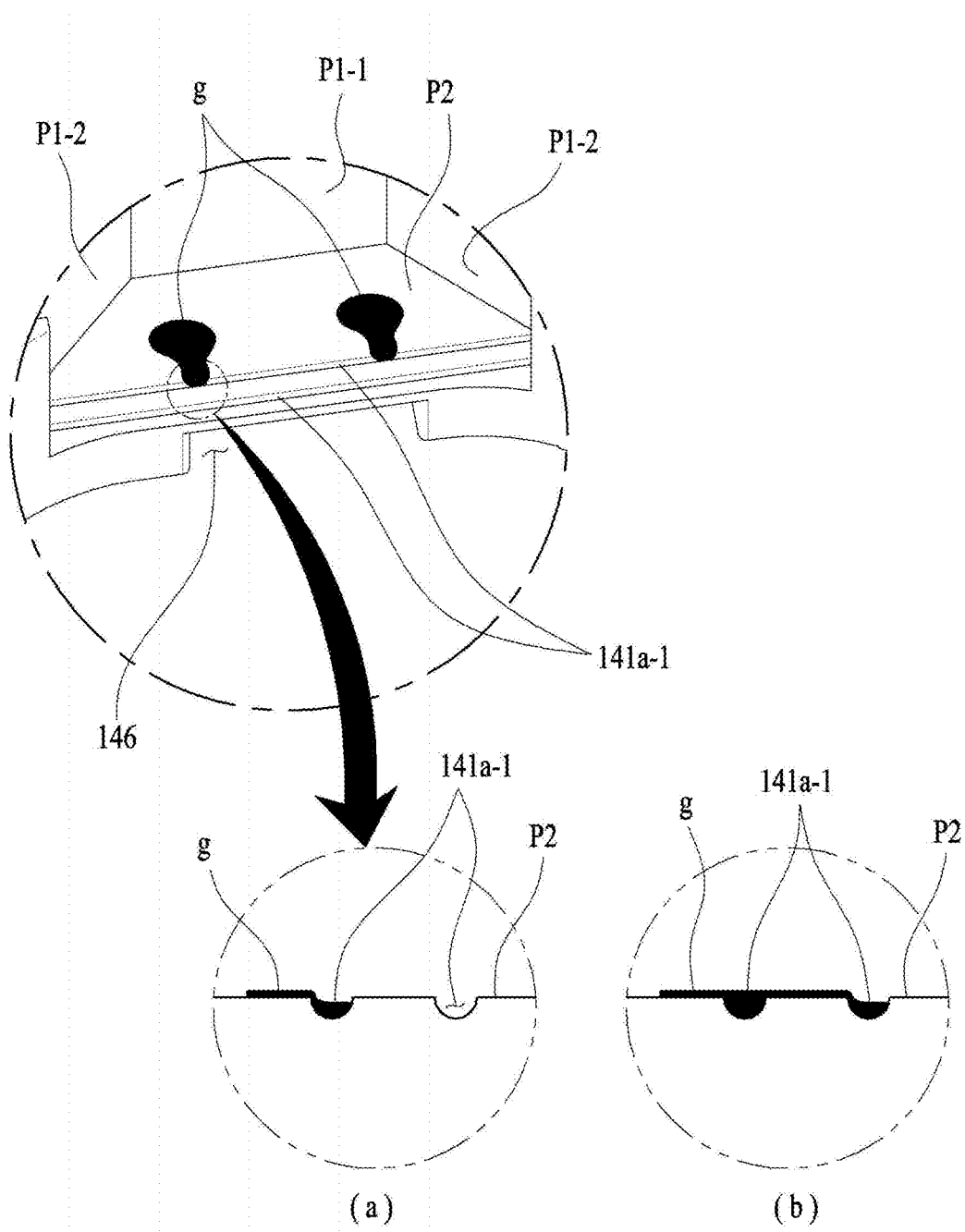

FIGS. 13 and 14 are enlarged views of circle A of FIG. 12. Although FIG. 13 illustrates the second flow restrictor 146a-1, the first flow restrictor 141a-1 is described with reference to FIGS. 13 and 14, and the second flow restrictor 146a-1 is described later with reference to FIGS. 15 and 16. In the embodiment, the first flow restrictor 141a-1 and the second flow restrictor 146a-1 may be selectively provided. In other words, one or both of the first flow restrictor 141a-1 and the second flow restrictor 146a-1 may be provided.

As shown in FIGS. 13 and 14, the first flow restrictor 141a-1 may be provided on the upper surface P2 of the first magnet mounting seat 141a at an inner position close to the open plane of the first magnet mounting seat 141a so as to prevent the adhesive g applied to the upper surface P2 or the side surface P1 of the first magnet mounting seat 141a, from flowing out of the first magnet mounting seat 141a.

Specifically, the first flow restrictor 141a-1 may be provided as a groove positioned parallel to the lower side of the trapezoid of the first magnet mounting seat 141a.

In the cross-sectional view shown in FIG. 13, although the first flow restrictor 141a-1 is configured to have a semicircular shape or a "U" shape, it may be configured to have various shapes without limitation as long as it can receive the flowable adhesive g therein.

As shown in FIG. 13, by way of example, although the first flow restrictor 141a-1 is constructed to have a pair of parallel grooves, the disclosure is not limited thereto. In other words, the number of first flow restrictors 141a-1 may be one or three or more.

The number of first flow restrictor 141a-1 may be appropriately determined in accordance with the area of the upper surface P2 of the first magnet seat 141a, the amount of adhesive g that is applied, or the like. Specifically, as the surface area of the upper surface P2 of the first magnet mounting seat 141a, the amount of adhesive g, or the like is increased, the number of first flow restrictors 141a-1 may be increased.

As shown in the cross-sectional view of FIG. 13(b), the upper surface P2 of the first magnet mounting seat 141a may be provided with a plurality of stepped portions s in order to restrict the flow of the adhesive g. Here, since the plurality of stepped portions s increases the length of the path through which the adhesive g flows on the upper surface P2, the plurality of stepped portions s may serve to prevent the adhesive g from flowing out of the first magnetic mounting seat 141a and to maintain the adhesive g on the first magnet mounting seat 141a.

Although two stepped portions s are, by way of example, illustrated in FIG. 13, the disclosure is not limited thereto. Specifically, the number of stepped portions s may be one or three or more. The stepped portion s may be formed on the upper surface P2, together with or without the first flow restrictor 141a-1. In this case, in order to further increase the length of the flowing path of the adhesive g, the edge of the stepped portion s may be chamfered so as to form an inclined surface similar to the second flow restrictor 146a-1

As shown in a cross-sectional view in FIG. 14(a), the adhesive g, which flows on the side surface P1 or the upper surface P2 of the first magnet mounting seat 141a, flows toward the open plane of the first magnet mounting seat 141a. The flowing adhesive g is first introduced in the first flow restrictor 141a-1, which is positioned farther away from the open plane of the first magnet mounting seat 141a, whereby the adhesive 9 cannot advance any further and cannot overflow out of the first magnet mounting seat 141a.

As shown in a cross-sectional view in FIG. 14(b), when too much adhesive g is applied or the viscosity of the adhesive g is excessively low, the adhesive g may further advance toward the open plane of the first magnet mounting seat 141a, beyond the first flow restrictor 141a-1.

At this time, the adhesive g is introduced into the first flow restrictor 141a-1, positioned closer to the open plane of the first magnet mounting seat 141a, whereby the adhesive g cannot advance any further and cannot overflow out of the first magnet mounting seat 141a.

As described above, when the number of first flow restrictors 141a-1 is appropriately selected in consideration of the surface area of the upper surface P2 of the first magnet mounting seat 141a, the typical amount of the adhesive g, or the like, it is possible to efficiently prevent the adhesive g from overflowing out of the first magnet mounting seat 141a.

According to the embodiment, thanks to the provision of the first flow restrictor 141a-1 formed in the upper surface P2 of the first magnet mounting seat 141a, it is possible to prevent the adhesive g from overflowing out of the first magnet mounting seat 141a.

Accordingly, since it is possible to prevent the adhesive g from overflowing out of the first magnet mounting seat 141a and being cured, malfunctions in autofocusing, handshake correction or the like of the lens moving apparatus due to protruding portions attributable to the cured adhesive g can be prevented.

Figure 15:
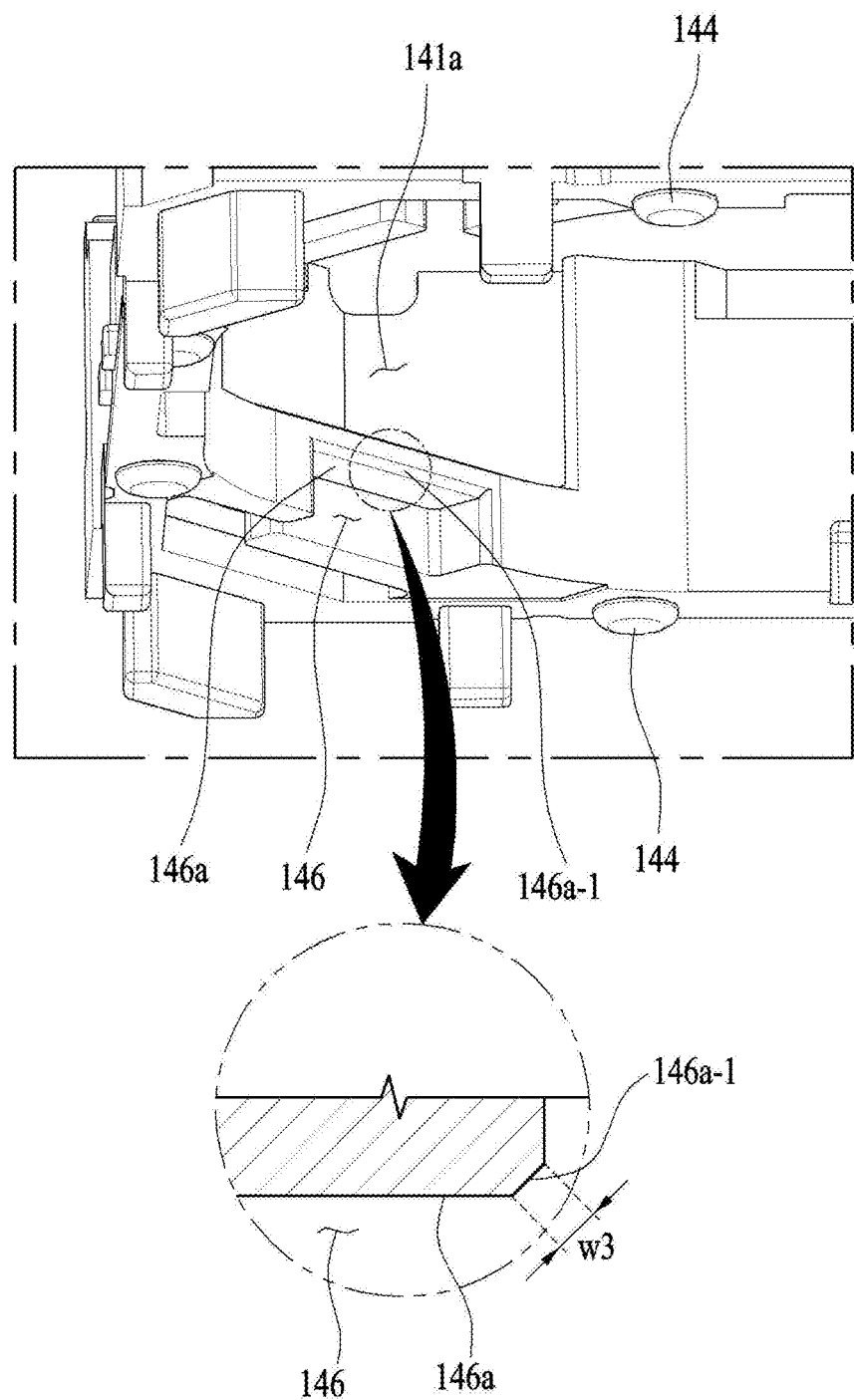
FIGS. 15 and 16 are views illustrating a second flow restrictor according to one embodiment.
Figure 16:
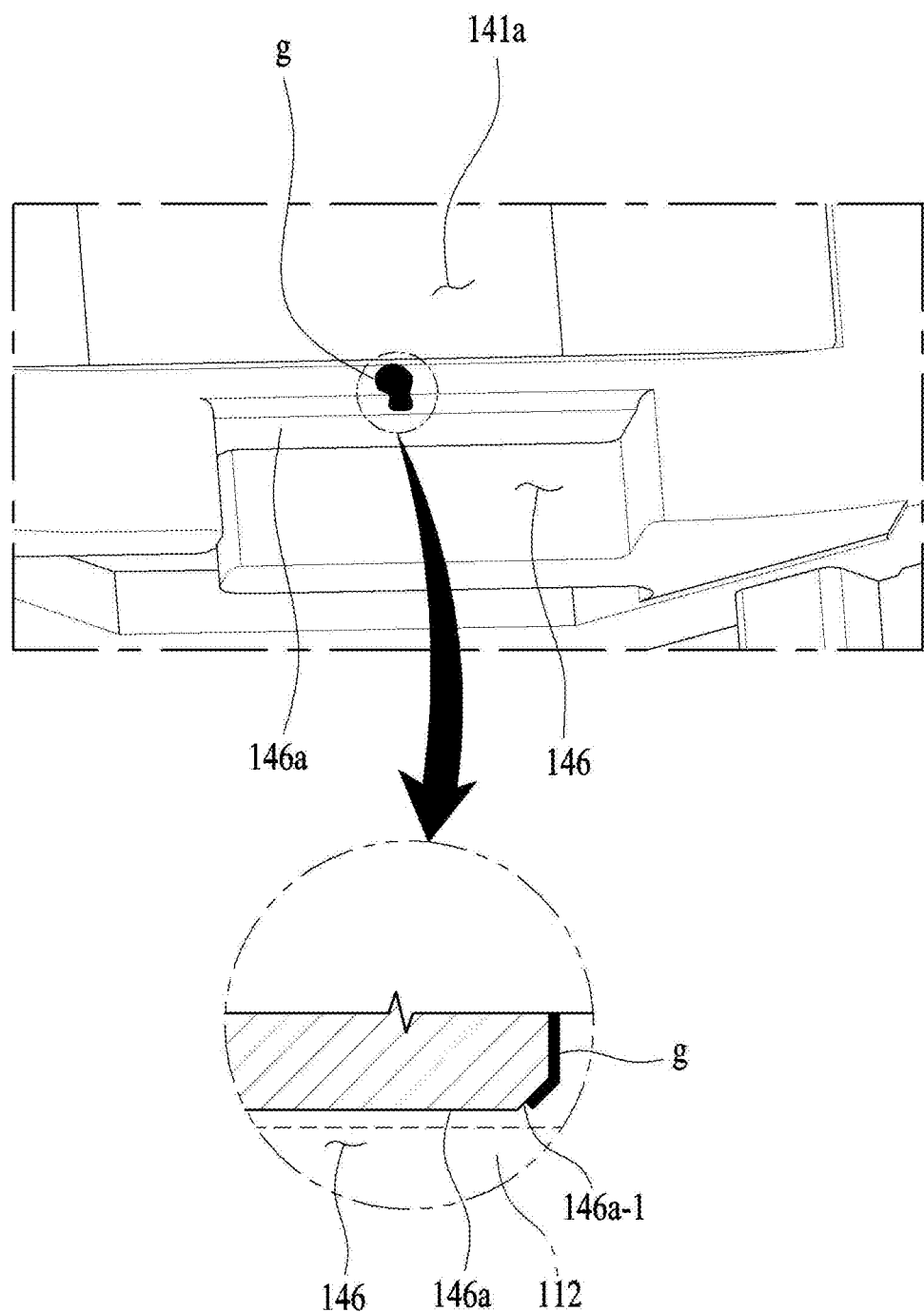

FIGS. 15 and 16 are views illustrating the second flow restrictor 146a-1 according to one embodiment. The housing 140 may be provided over the first magnet mounting seat 141a thereof with a bobbin mounting seat 146 in which the bobbin 110 is partially received, and the area of the housing 140 where the inner surface of the housing and the bobbin mounting seat 146 meet in the first direction may be provided with the second flow restrictor 146a-1 for restricting the flow of the adhesive g.

Specifically, the second flow restrictor 146a-1 may be formed at the area where the lower surface 146a of the bobbin mounting seat 146 meets the inner surface of the housing 140.

The second flow restrictor 146a-1 may be configured as an inclined surface when viewed in the first direction. By way of example, the second flow restrictor 146a-1 may be formed into the inclined surface through chamfering.

The second stopper 112, which is a portion of the bobbin 110, may be mounted in the bobbin mounting seat 146. The bobbin mounting seat 146 may serve to restrict the movable range of the second stopper 112.

The second stopper 112 may not be securely mounted in the bobbin mounting seat 146, but may be movable within the volume range defined by the bobbin mounting seat 146. Accordingly, when the adhesive g flows into the bobbin mounting seat 146 from the first magnet mounting seat 141a and is then cured in the bobbin mounting seat 146, the cured protruding adhesive g may further restrict the range within which the second stopper 12 is movable, thus causing operational malfunctions of the lens moving apparatus.

Furthermore, when the cured protruding adhesive g repeatedly collides with the second stopper 112, the adhesive g may temporarily adhere to the second stopper 112 due to the adhesiveness of the adhesive g. Hence, the cured protruding adhesive g may temporarily restrict the movement of the second stopper 112, thus causing operational malfunctions of the bobbin 110 including the second stopper 112 or of the entire lens moving apparatus.

As shown in FIG. 16, the second flow restrictor 146a-1 may be embodied as an inclined surface for restricting the flow of the adhesive g. Specifically, in the case of a sharp edge having no second flow restrictor 146a-1, when the adhesive g flows down from the first magnet mounting seat 141a and reaches the lower surface 146a of the bobbin mounting seat 146, the adhesive g may partially infiltrate into the bobbin mounting seat 146. When the bobbin 110 is first coupled to the housing 140 during the operation of assembling the lens moving apparatus, a portion of the adhesive g may drop on the second stopper 112 of the bobbin 110 and may be cured thereon.

Even when the adhesive g does not drop, a protruding portion may be created on the end of the lower surface 146a of the bobbin mounting seat 146 in the first direction, and such a protruding portion may also cause operational malfunctions of the second stopper 112.

In contrast, in the case in which the second flow restrictor 146a-1 is embodied as an inclined surface, when the adhesive g flows down and reaches the upper end of the second flow restrictor 146a-1, the adhesive g flows along the inclined surface while changing its flowing direction. Accordingly, since the adhesive g adheres to the inclined surface, the adhesive g does not flow down any further, and does not create a protruding portion.

As the width w4 of the second flow restrictor 146a-1, that is, the width of the inclined surface in the cross-sectional view of FIGS. 15 and 16 is increased, the effect of restricting the flow of the adhesive g may be increased. Accordingly, the width w3 of the second flow restrictor 146a-1 is preferably as large as possible, as long as it has no influence on the overall operation of the lens moving apparatus.

Figure 17:
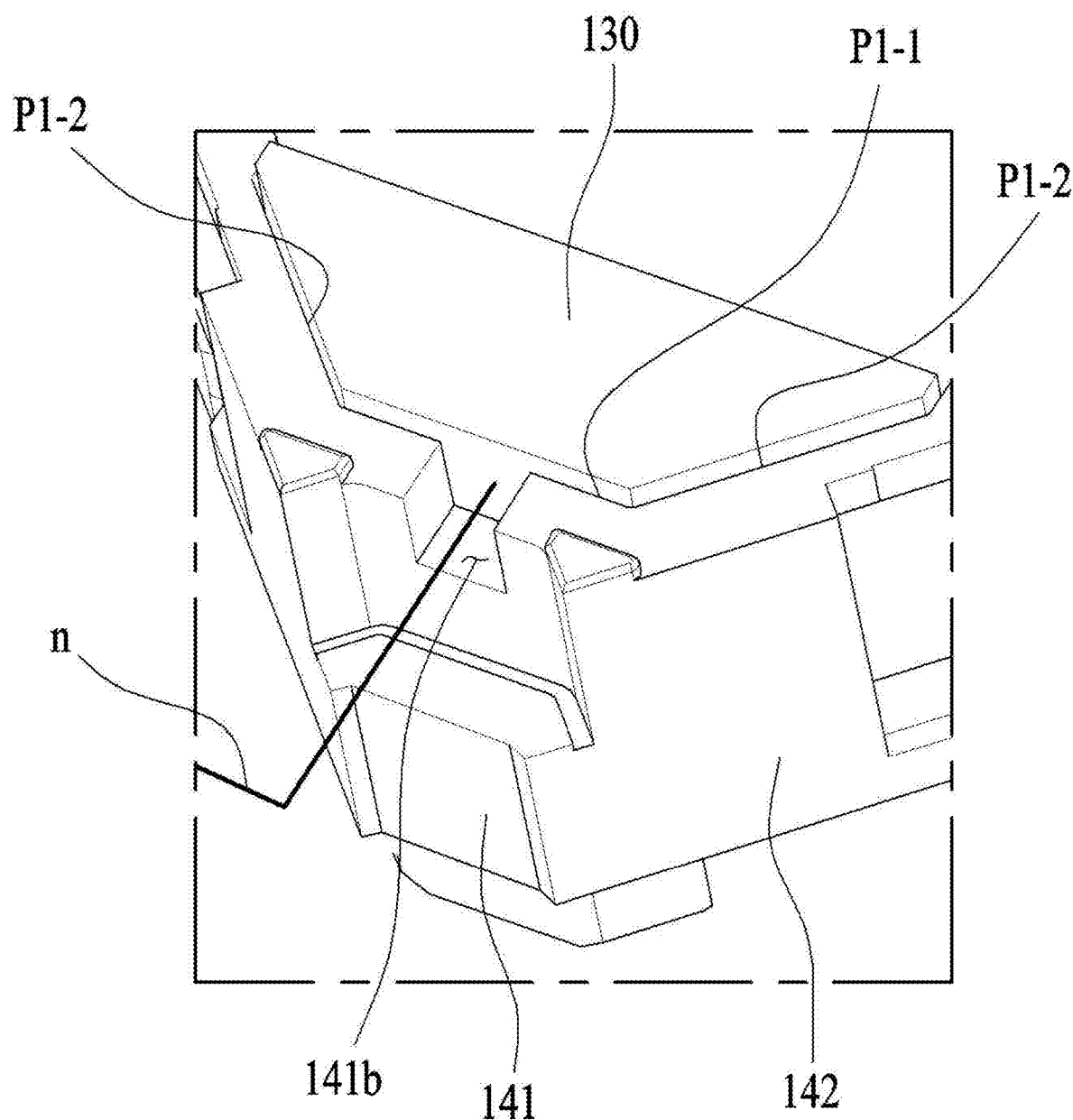
FIG. 17 is a view showing an adhesive inlet according to one embodiment.
Figure 18:
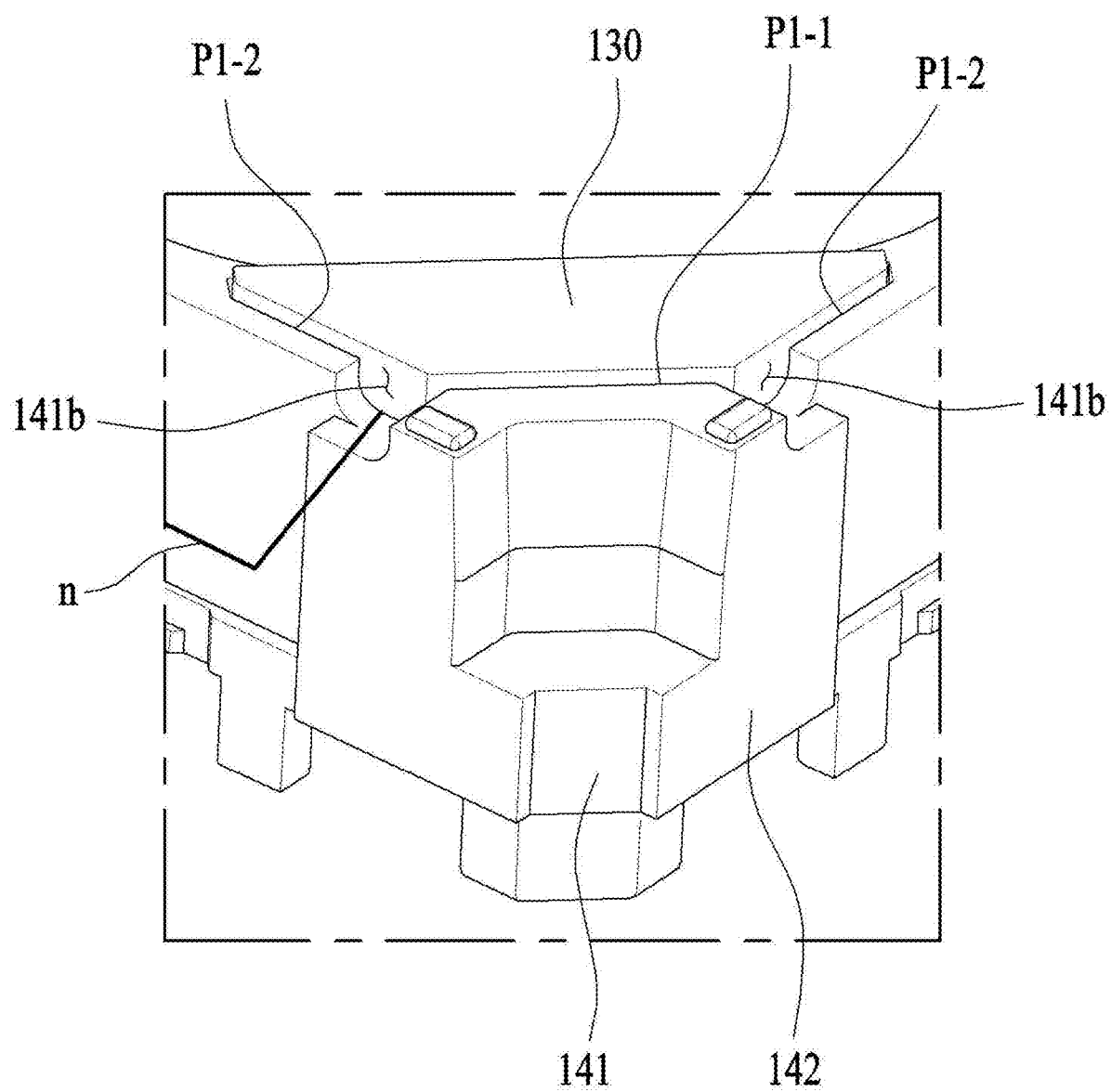
FIG. 18 is a view showing an adhesive inlet according to another embodiment.

FIG. 17 is a view showing the adhesive inlet 141b according to one embodiment. FIG. 18 is a view showing the adhesive inlet 141b according to another embodiment.

As shown in FIG. 17, the adhesive inlet 141b may be formed in the first side surface P1-1. In this case, when additional adhesive g is injected into the bonding area from the injector n, the adhesive g, discharged from the point of the injector, first permeates the bonding area on the first side surface P1-1 of the first magnet mounting seat 141a, and then permeates the second side surface P1-2 and the upper surface P2 of the first magnet mounting seat 141a.

In contrast, as shown in FIG. 18, the second side surfaces P1-2 may be provided with the respective adhesive inlets 141b. In this case, although one of the two second side surfaces P1-2 may be provided with the adhesive inlet 141b, both of the second side surfaces P1-2 are preferably provided with respective adhesive inlets 141b, in order to allow the adhesive g to be uniformly applied to both of the side surfaces P1-2.

In this case, when additional adhesive g is injected to the bonding area from the injector n, the adhesive g discharged from the point of the injector first permeates the bonding area on the second side surface P1-2 of the magnet mounting seat 141a and then permeates the first side surface P1-1 and the upper surface P2 of the first magnet mounting seat 141a.

Alternatively, the embodiments shown in FIGS. 17 and 18 may be combined with each other. In other words, the adhesive inlet 141b may be formed in both the first side surface P1-1 and the second side surface P1-2. In this case, the adhesive inlets 141b are preferably formed in both of the second side surfaces P1-2, respectively, in order to allow the adhesive g to be uniformly applied to both of the second side surfaces P1-2. Consequently, a total of three adhesive inlets 141b may be provided in this embodiment.

Figure 19:
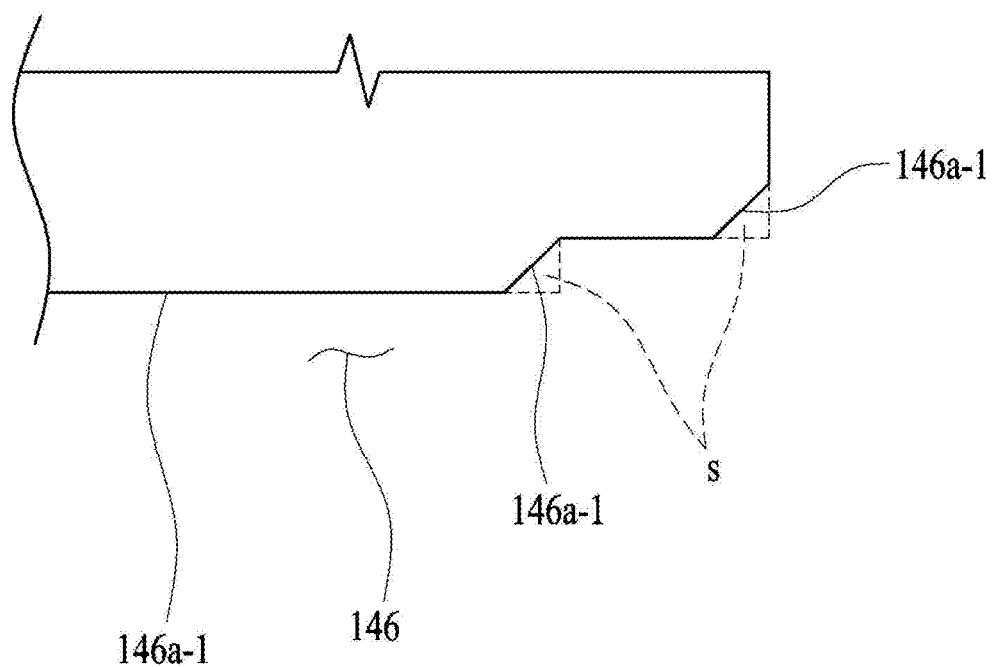
FIG. 19 is a view illustrating a second flow restrictor according to another embodiment.

FIG. 19 is a view illustrating the second flow restrictor 146a-1 according to another embodiment. As shown in FIG. 19, a plurality of stepped portions s may be formed at portions where the inner surface of the housing 140 meets the bobbin mounting seat 146, and the individual stepped portions s may be provided with respective second flow restrictors 146a-1.

In other words, a plurality of second flow restrictors 146a-1 may be provided. The embodiment including the plurality of second flow restrictors 146a-1 may be more effective in restricting the flow of the adhesive g by virtue of the second flow restrictors 146a-1, compared to the embodiment including only one second flow restrictor 146a-1.

The plurality of flow restrictors 146a-1 may be formed, for example, in such a manner as to form a plurality of stepped portions s at areas where the inner surface of the housing meets the upper surface P2 of the first magnet mounting seat 141a and the lower surface 146a of the bobbin mounting seat 146 and to chamfer the respective stepped portions s.

Although two second flow restrictors 146a-1 are provided in this embodiment, the disclosure is not limited thereto. The number of second flow restrictors 146a-1 may be appropriately selected in consideration of the available space in the housing 140 and influences on the overall operation of the lens moving apparatus.

The second flow restrictors 146a-1 may be provided at all or some of the plurality of stepped portions s. In the case where the second flow restrictors 146a-1 are provided at only some of the plurality of stepped portions s, the first portion where the adhesive g, which has flowed from the upper surface P2, is introduced into the bobbin mounting seat 146, that is, the first stepped portion s which is directly connected to the inner surface of the housing 140, is necessarily provided with the second flow restrictor 146a-1.

Alternatively, although the plurality of stepped portions s are provided, the plurality of stepped portion s may not be chamfered. In this case, the plurality of stepped portions s may serve as the second flow restrictors.

In the embodiment, the second flow restrictors 146a-1 serve to prevent the adhesive g, which has flowed from the first magnet mounting seat 141a, from being introduced into the bobbin mounting seat 146 and being cured thereat, or to serve to prevent the adhesive g from being cured at the lower end 146a of the bobbin mounting seat 146 and protruding therefrom, thus preventing operational malfunctions of the overall lens moving apparatus.

Figure 20:
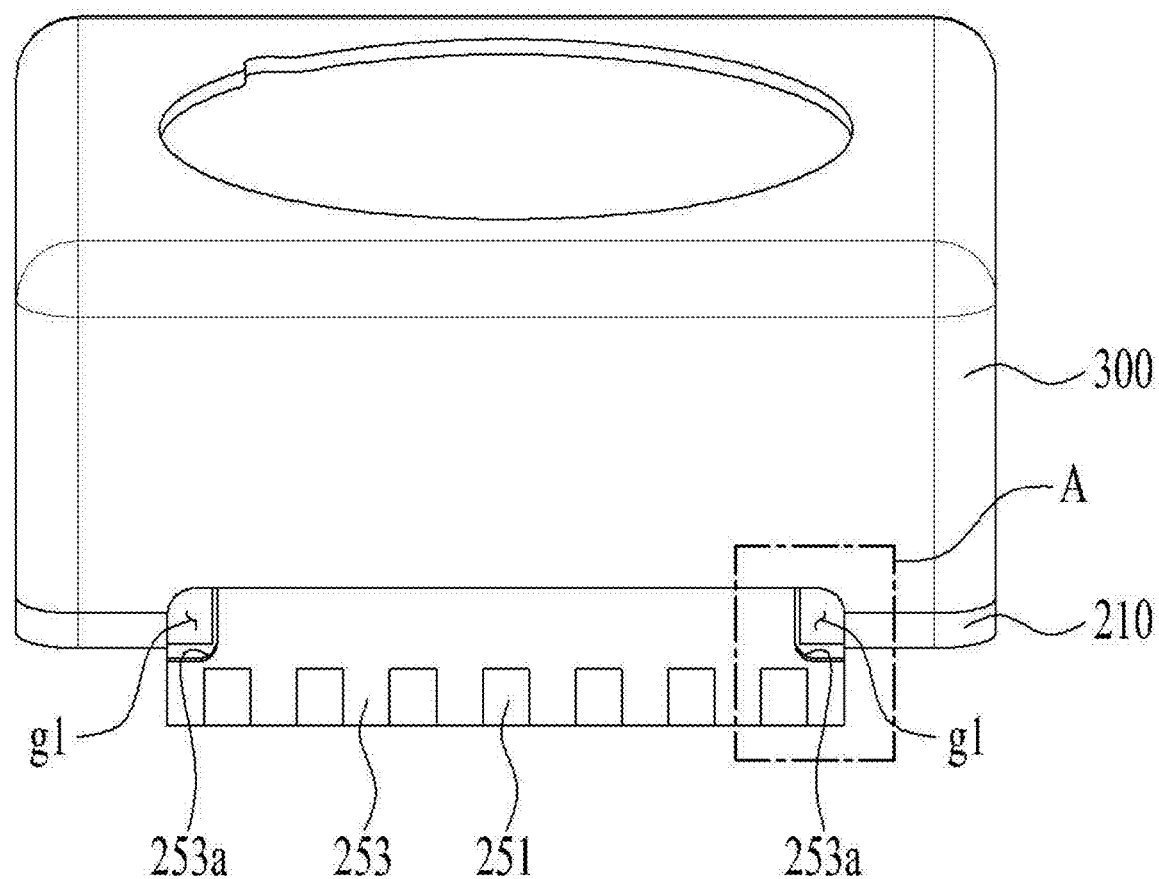
FIG. 20 is a schematic perspective view showing the lens moving apparatus according to another embodiment.
Figure 21:
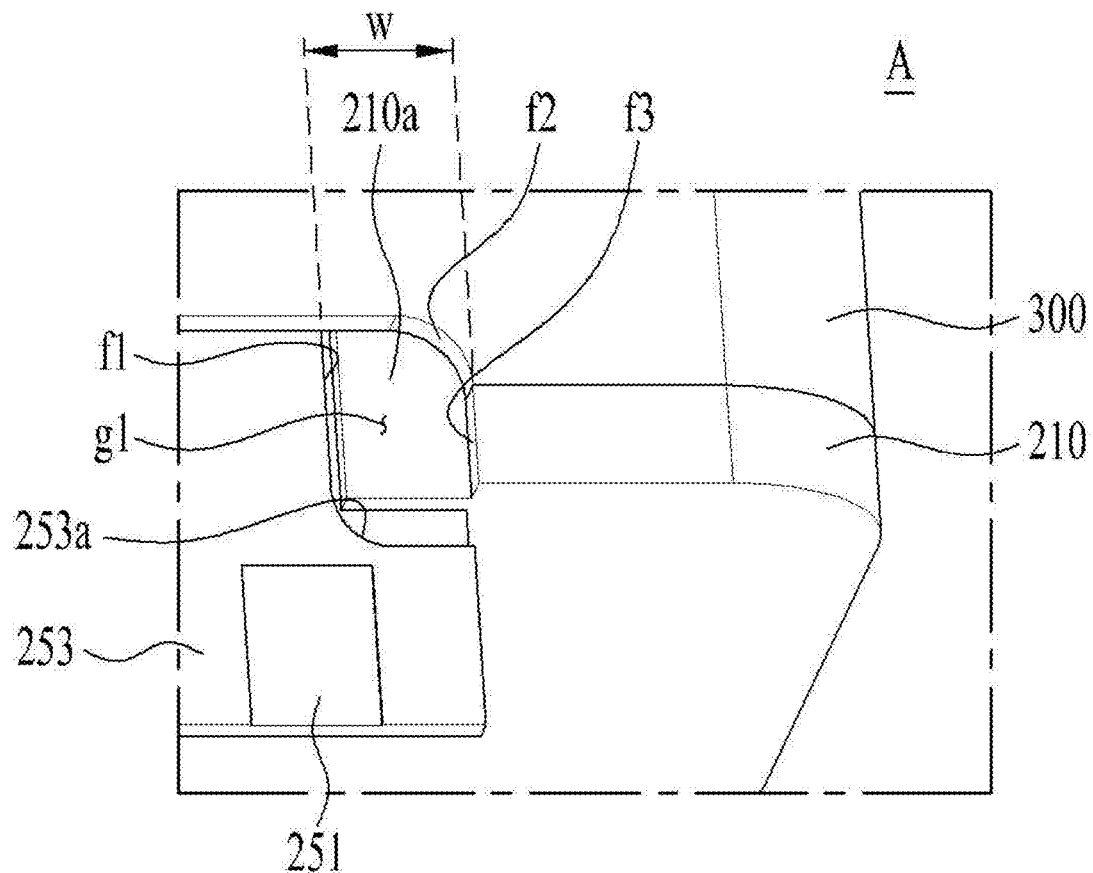
FIG. 21 is an enlarged view showing area A of FIG. 20.

FIG. 20 is a schematic perspective view showing the lens moving apparatus according to another embodiment. FIG. 21 is an enlarged view showing area A of FIG. 20.

As shown in FIGS. 20 and 21, the lens moving apparatus according to the embodiment may include the printed circuit board 250, the cover member 300, and a recess g1 defined by a portion of the base 210 surrounding the recess g1.

The printed circuit board 250 may include at least one bent terminal member 253, and the first recess g1 may be formed in both sides of the upper portion of the terminal member 253. The both sides of the upper portion of the terminal member 253 may be provided with recesses 253a constituting a part of the first recess g1.

The terminal member 253 may be provided with a plurality of terminals 251 so as to receive external power and supply the power to the first coil 120 and the second coil 230. The number of terminal members 253 may be increased or decreased depending on the kinds of components to be controlled.

The first recess g1 is intended to allow an adhesive to be introduced therethrough so that the adhesive penetrates the gap between the cover member 300 and the base 210 and fills the gap.

The first recess g1 may be surrounded by a first surface f1, which is defined by one end of the terminal member 253, a second surface f2, which is defined by one end of the cover member 300, and a third surface f3, which is defined by one end of the base 210. The first recess g1 may be open at the front side and may be closed by the outer surface 210a of the base 210.

As shown in FIG. 21, the outer surface 210a of the base 210, which defines the first recess g1, may be provided at the center thereof with a projection. Here, since the gaps between the printed circuit board 250, the cover member 300 and the base 210 face the side surface of the projection, adhesive that has been introduced into the first recess g1 flows toward the end of the projection and thus easily penetrates the gaps, thus making it easy to perform bonding using an adhesive.

The first recess g1 may include a pair of first recesses, which are spaced apart from each other by a predetermined distance. Since the gaps between the printed circuit board 250, the cover member 300 and the base 210 are positioned at both sides of an upper portion of the terminal member 253, the pair of first recesses g1 are provided in order to bond the gaps.

The adhesive that is used in the bonding procedure may be made of polymer-based material such as epoxy. When the adhesive has a low viscosity, although the bonding procedure of filling the gap may be easily performed by virtue of the high fluidity, the bonding force may be decreased. On the other hand, when the adhesive has a high viscosity, although the adhesive has a high bonding force, the bonding procedure may not be easily performed due to the low fluidity.

Therefore, considering facilitation of work, the bonding strength between the printed circuit board 250, the cover member 300 and the base 210 after the bonding procedure, there is a need to perform the bonding procedure using an adhesive having an appropriate viscosity.

The width w of the first recess g1, which is measure in the length direction of the terminal member 253, may be determined in consideration of whether the needle of the adhesive injector, which is used in the bonding procedure, can easily enter the first recess g1, ease of formation of the first recess g1, facilitation of the bonding procedure, and the like.

Considering these matters, the width w of the first recess g1 is 0.1 mm or more, preferably 0.3 mm or more, and more preferably 0.1 mm-0.6 mm.

Figure 22:
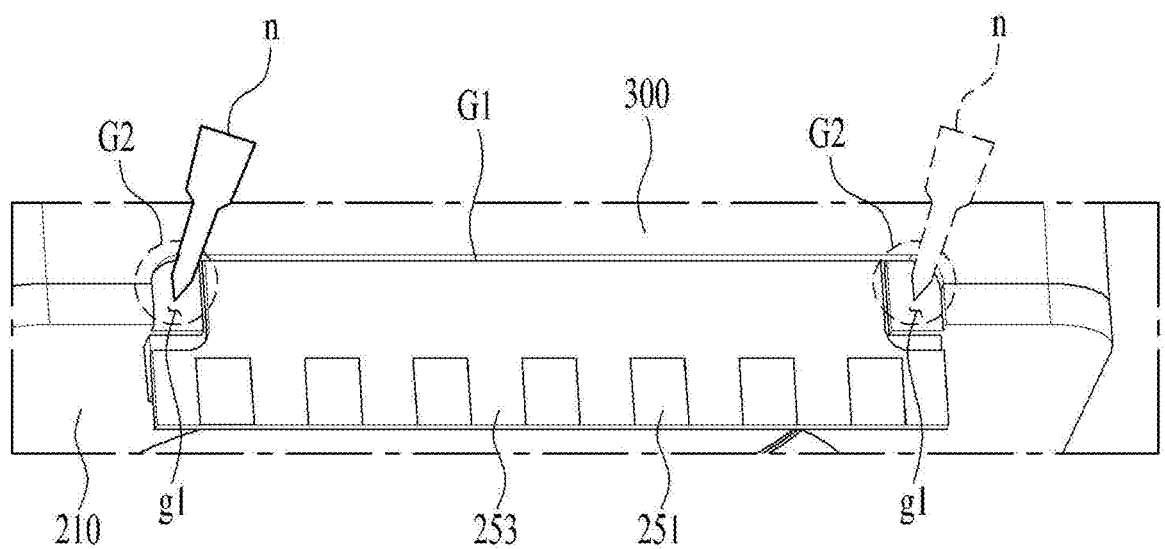
FIG. 22 is a view showing a bonding procedure of coupling the lens moving apparatus according to another embodiment.

FIG. 22 is a view showing a bonding procedure of coupling the lens moving apparatus according to another embodiment.

The bonding procedure of coupling the terminal member 253, the cover member 300 and the base 210, which are provided at the printed circuit board 250, may be performed using an application device on which the adhesive injector is mounted.

As shown in FIG. 22, the bonding procedure may be performed, for example, by filling and bonding, using the adhesive, a first gap G1 between the terminal member 253 and the cover member 300 and a second gap G2 between the terminal member 253, the cover member 300 and the base 210 while moving the needle of the adhesive injector in the length direction of the terminal member 253, that is, in the horizontal direction in the drawing.

As shown in FIG. 22, when the bonding procedure is performed in the lens moving apparatus equipped with the first recess g1 according to the embodiment while moving the needle from the left to the right, the bonding procedure may be easily implemented at the first gap G1. Furthermore, since the second gap G2 is provided with the first recess g1, the bonding procedure may also be easily implemented at the second gap G2. The specific bonding procedure will now described hereinafter.

The needle is first disposed at the first recess g1 positioned at the second gap G2, which is represented at the left side of the drawing, and sufficient adhesive is injected into the first recess g1. The injected adhesive is introduced into the first recess g1, and is further introduced into the second gap G2, where the terminal member 253, the cover member 300 and the base 210 define the first recess g1.

A sufficient amount of adhesive is introduced into the second gap G2 through the first recess g1, and thus the terminal member 253, the cover member 300 and the base 210 are bonded to each other with a sufficient coupling force, and the second gap G2 may be completely sealed. After the bonding procedure at the second gap G2 is completed, a procedure of sealing the first gap G1 may be performed.

Subsequently, a bonding procedure is performed in such a manner as to fill the first gap G1 with an adhesive while moving the needle positioned at the first recess g1 to the right in the drawing.

At this point, by injecting a sufficient amount of adhesive into the first gap G1 and appropriately controlling the moving speed of the needle, the terminal member 253 and the cover member 300 may be coupled to each other with a sufficient coupling force therebetween, and the first gap G1 may be completely sealed.

Subsequently, the needle is disposed at the first recess g1, which is positioned at the second gap G2, which is represented at the right of the drawing, and the same bonding procedure as that performed at the second gap G2, which is represented at the left of the drawing, is performed.

Through these procedure, the terminal member 253, the cover member 300 and the base 210 may be bonded to each other with a sufficient coupling force therebetween, and the second gap G2 may thus be completely sealed.

According to the embodiment, since the bonding procedure is performed by injecting the adhesive into the first recess g1, the gap between the terminal member 253, the cover member 300 and the base 210 is completely sealed, and the terminal member 253, the cover member 300 and the base 210 may thus be coupled to each other with a sufficient coupling force therebetween.

Figure 23:
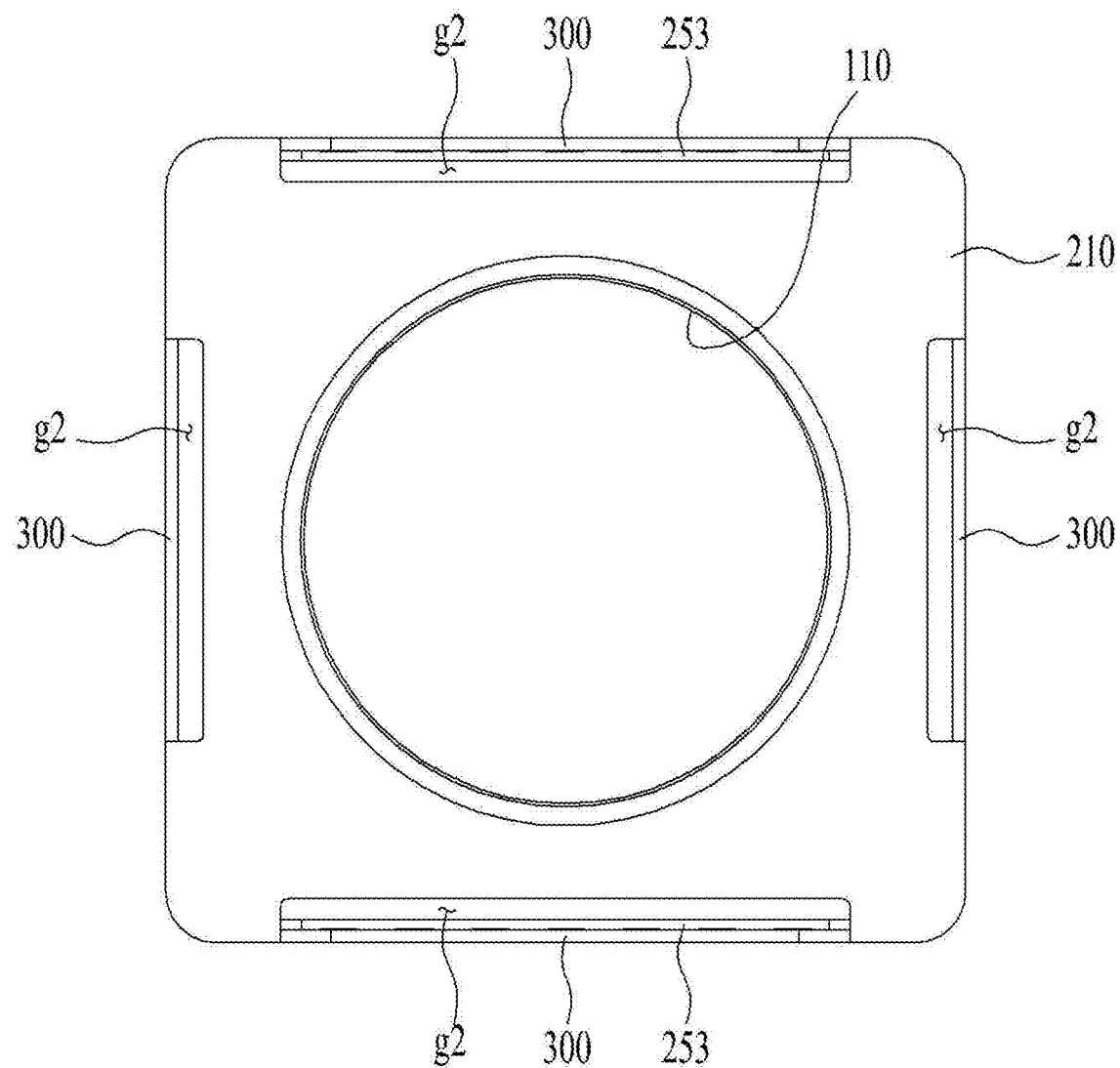
FIG. 23 is a bottom view showing a base according to one embodiment.

FIG. 23 is a bottom view showing the base 210 according to one embodiment. The base 210 according to the embodiment may include a second recess g2, which is positioned between the bottom surface thereof and the cover member 300 or the printed circuit board 250 so as to bond the base 210 to the cover member 300 or the printed circuit board 250.

At this point, the terminal member 253, which is bent from the printed circuit board 250, and the base 210 are bonded to each other, and the second recess g2 may be provided at the area where the base 210 is coupled to the terminal member 253. Meanwhile, the cover member 300 and the base 210 are bonded to each other, and the second recess g2 may be provided at the area where the cover member 300 is coupled to the base 210.

In order to block the infiltration of external pollutants into the inside of the lens moving apparatus, there is a need to perform a bonding procedure. However, in the case where the gap between the terminal member 253, the base 210 and the cover member 300 is sealed with an adhesive, the bonding procedure is not so easy due to the presence of the terminals of the terminal member 253.

Specifically, when the bonding procedure is performed at the front surface, at which the terminals of the terminal member 253 are formed, the adhesive may adhere to the terminals. After the assembly of the lens moving apparatus including the bonding procedure, the adhesive adhering to the terminals may cause bad connections, malfunctions attributable to the bad connections, or the like during tests of the performance of the lens moving apparatus or upon actual use of the lens moving apparatus.

When the bonding procedure is performed at the front surface of the terminal member 253 at which the terminals are formed, since a plurality of projections or recesses are present at the area where the terminal member 253, the base 210 and the cover member 300, which may obstruct the movement of the needle for applying the adhesive, are coupled to each other, the bonding procedure may not be smoothly implemented, and the needle may be bent or broken during the bonding procedure.

Accordingly, in the embodiment, the bonding procedure is performed at the rear surface of the terminal member 253 rather than at the front surface so as to make it easy to implement the bonding between the terminal member 253, the base 210 and the cover member 300 and to achieve complete sealing by virtue of the bonding procedure.

The base 210 may be configured to have a square contour, and the second recesses g2 may be provided at respective sides of the square shape. The area where the cover member 300 or the terminal member 253 of the printed circuit board 250 is coupled to the base 210 may be provided at the respective sides of the square shape.

The second recess g2 may be formed close to the gap between the terminal member 253, the base 210 and the cover member 300, and may be closed at the inner side and open at the outer side so as to communicate with the gap.

Consequently, the adhesive is injected into the second recess g2, and is subsequently introduced into the gap positioned at the open area of the second recess g2 so as to fill the gap, thus completing the bonding procedure. By injecting an appropriate but sufficient amount of adhesive into the second recess g2, the gap may be completely filled and sealed with the adhesive.

Figure 24:
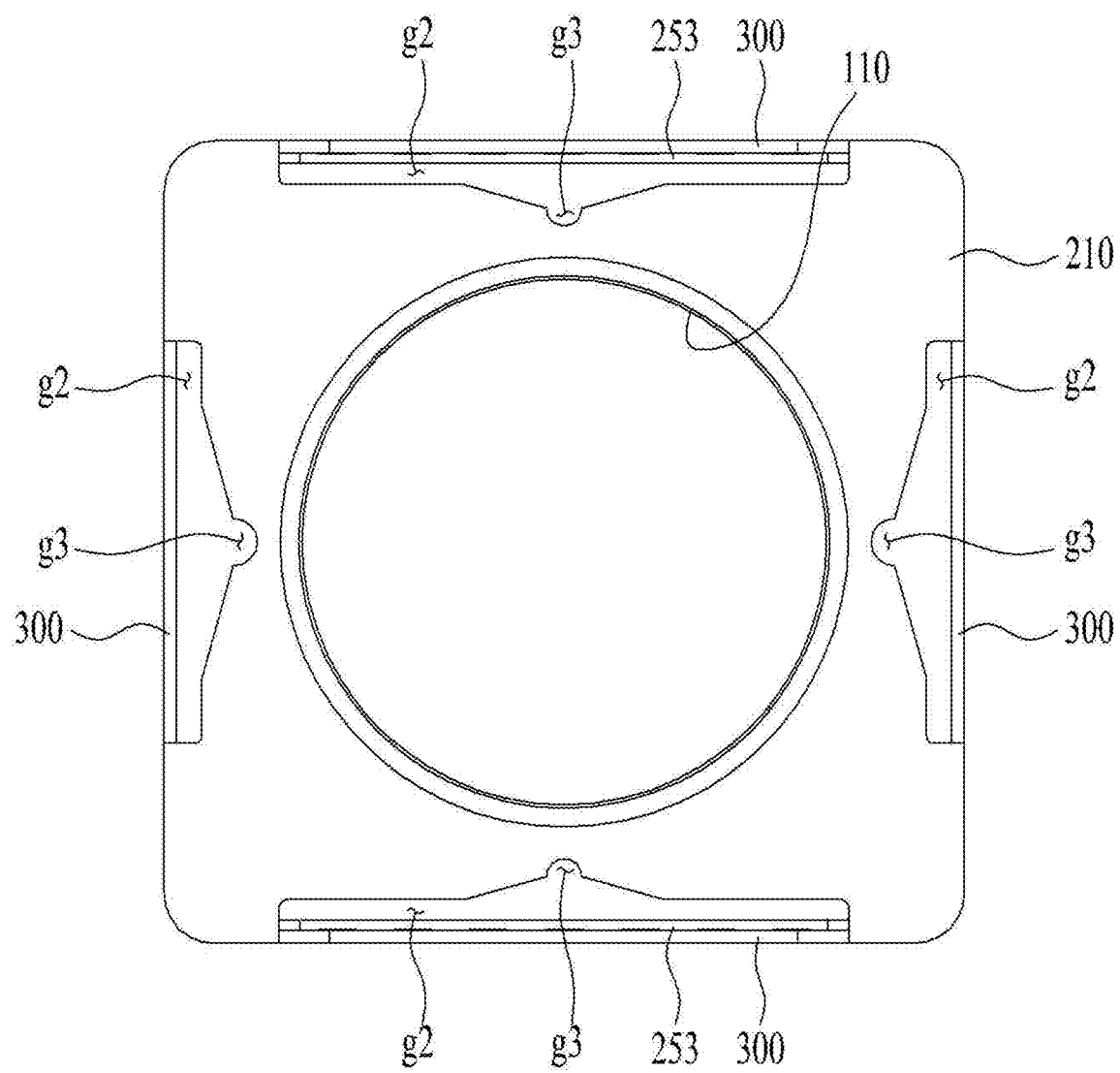
FIG. 24 is a bottom view showing a base according to another embodiment.

FIG. 24 is a bottom view showing a base 210 according to another embodiment. As shown in FIG. 24, the second recess g2 may be provided with a third recess g3, which is recessed toward the center of the base 210.

The third recess g3 may be additionally provided at the second recess g2. By virtue of the provision of the third recess g3, when an adhesive is injected into the third recess g3, the adhesive may be introduced into the gap through the second recess g2 from the third recess g3, thus sealing the gap.

A point application technology of injecting an adhesive into the third recess g3 at a single point may have effects of remarkably reducing breakage and bending of the needle compared to a line application technology of disposing the needle at an initial position and moving the needle along the gap.

Figure 25:
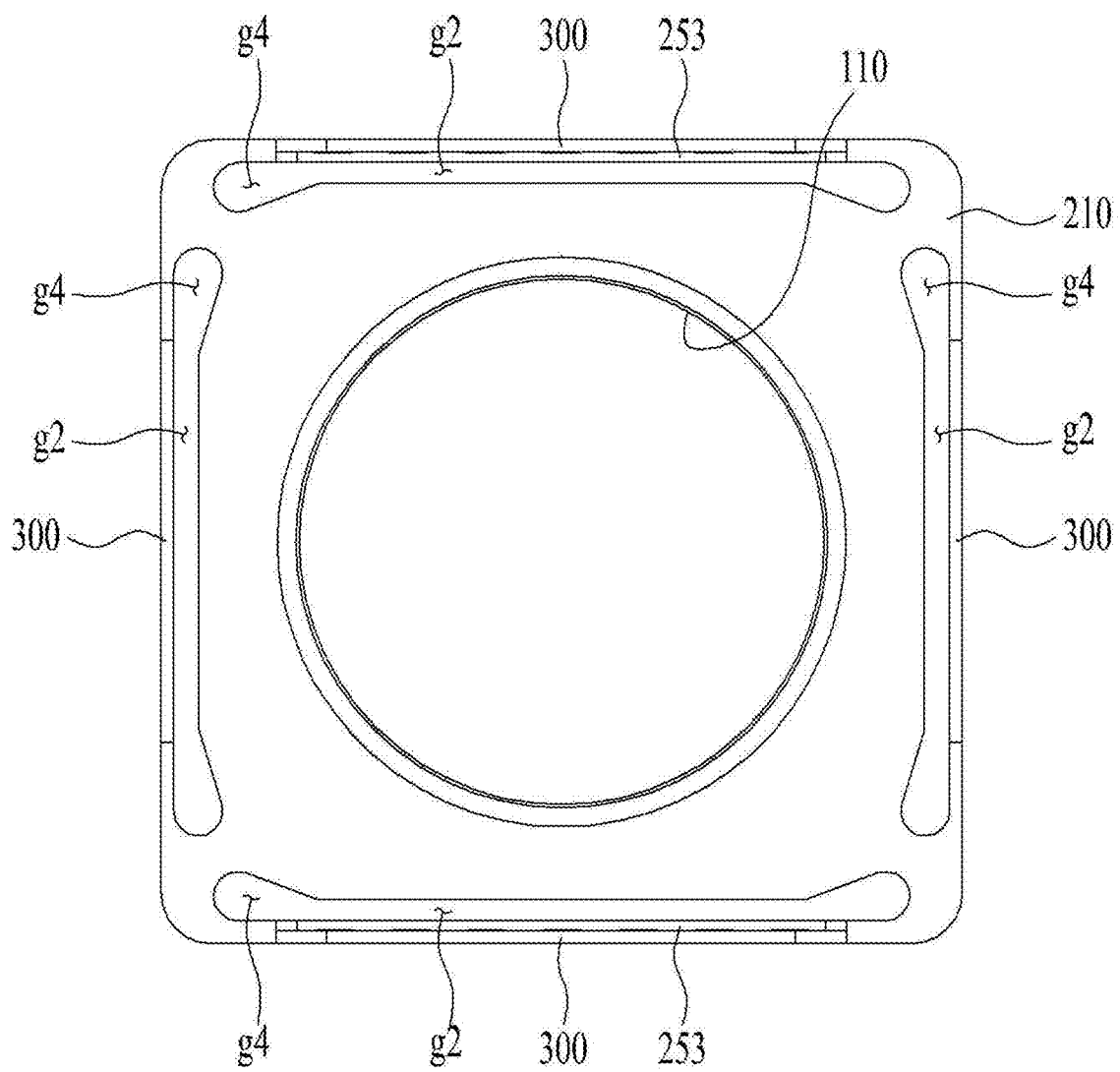
FIG. 25 is a bottom view showing a base according to a further embodiment.

FIG. 25 is a bottom view showing the base 210 according to a further embodiment. As shown in FIG. 25, the second recess g2 may be provided with a fourth recess g4, which is recessed toward the corner of the base 210.

The fourth recess g4 may include a plurality of fourth recesses g4, which are symmetrically positioned with respect to an imaginary center line that extends through the center of each side of the base 210 and the center of the base 210. Although FIG. 25 illustrates a pair of fourth recesses g4 at each fourth recess g4, the disclosure is not limited thereto.

Specifically, the fourth recess g4 may include four or more fourth recesses g4, which are symmetrically positioned. Although the corresponding fourth recesses g4 are symmetrically positioned with respect to each other, there is no need to configure the corresponding fourth recesses g4 to have symmetrical shapes.

Like the third recess g3, the fourth recess g4 may be additionally provided at the second recess g2. When an adhesive is injected into the fourth recess g4 during the bonding procedure, the adhesive may be introduced into the gap through the second recess g2 from the fourth recess g4, thus sealing the gap.

As in the preceding example, the point application technology of injecting an adhesive into the third recess g4 at a single point may have effects of remarkably reducing breakage and bending of the needle compared to the line application technology of disposing the needle at an initial position and moving the needle along the gap.

Figure 26:
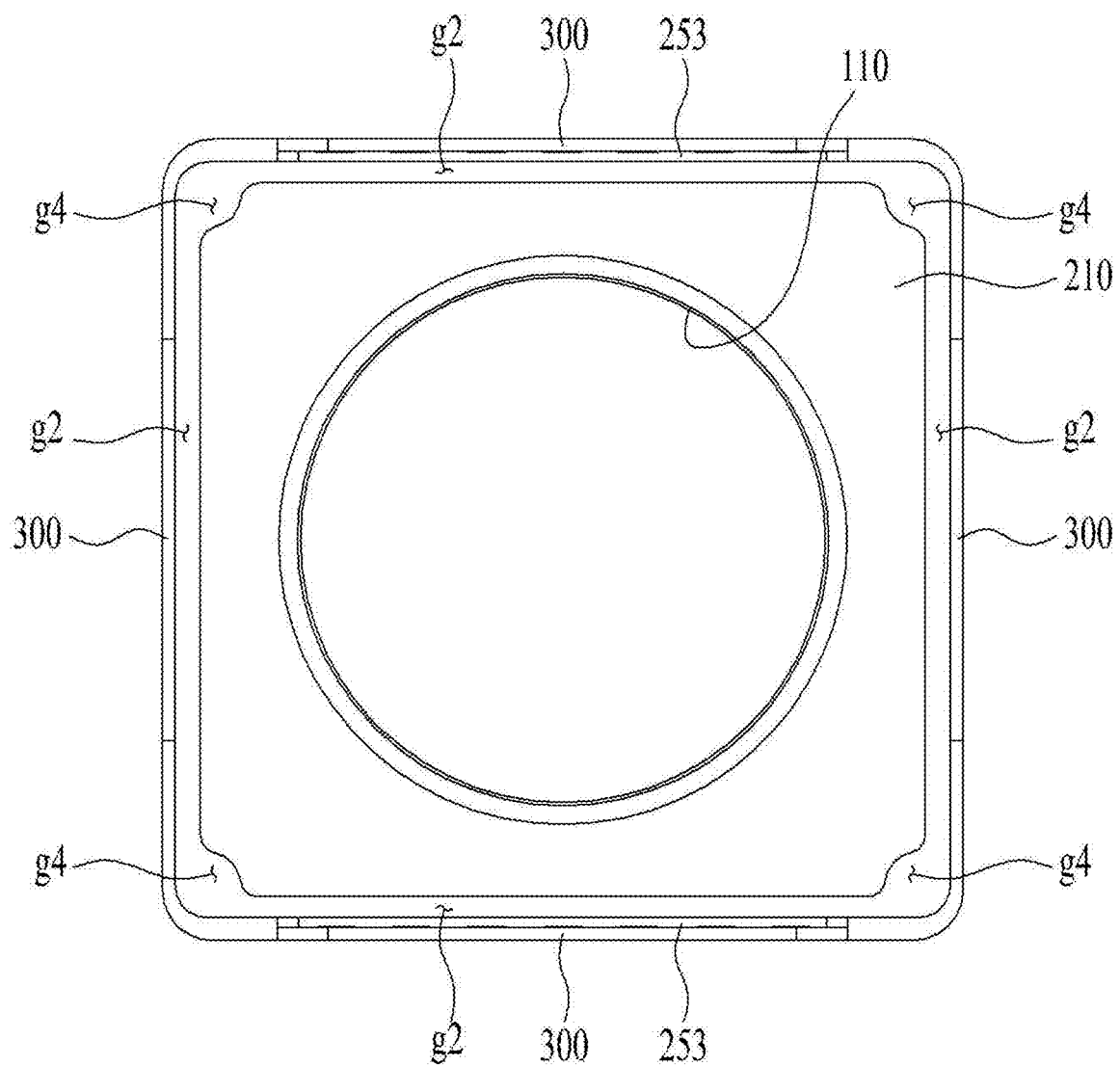
FIG. 26 a bottom view showing a base according to still another embodiment.

FIG. 26 a bottom view showing a base 210 according to still another embodiment. As shown in FIG. 26, the fourth recesses g4 are formed at respective corners of the base 210, and two adjacent fourth recesses g2, with the corner disposed therebetween, may be connected to each other via the associated fourth recess g4.

Accordingly, the second recesses g2, which are formed in the bottom surface of the base 210, may be connected to each other via the fourth recesses g4. Here, an adhesive, which has been injected into the fourth recesses g4, may be introduced into the second recesses g2, which are adjacent to each other with the corners of the base 210 therebetween, and may be introduced into the gaps, which are adjacent to each other with the corners of the base 210 therebetween.

Figure 27:
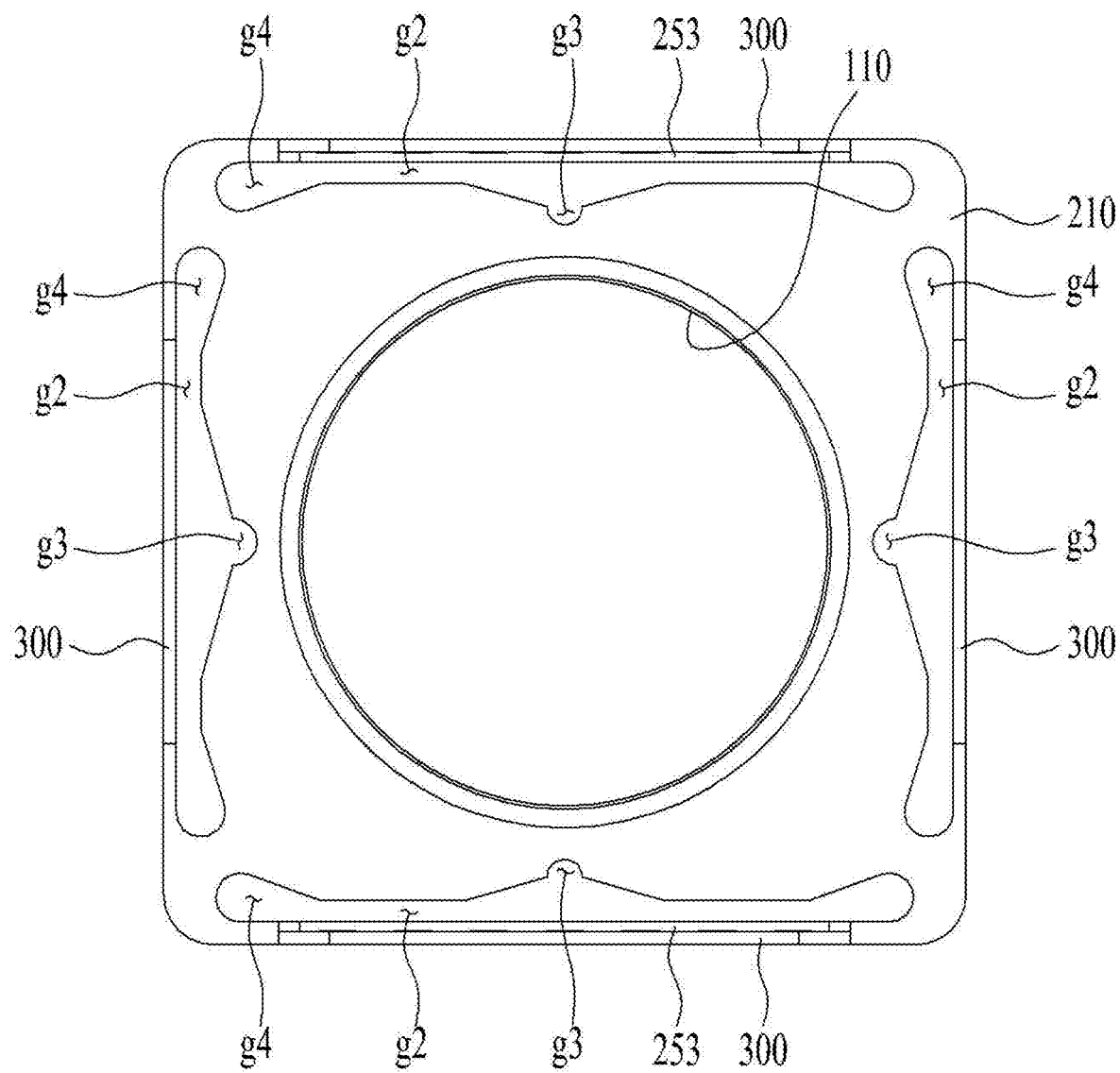
FIG. 27 is a bottom view showing a base according to yet another embodiment.

FIG. 27 is a bottom view showing a base 210 according to yet another embodiment. As shown in FIG. 27, the second recess g2 may be provided with the third recess g3, which is recessed toward the center of the base 210, and the fourth recess g4, which is recessed toward the corner of the base 210. The fourth recess g4 may include a plurality of fourth recesses g4, which are symmetrically positioned with respect to each other.

In this embodiment, the point application technology may be performed so as to inject an adhesive into the third recess g3 and/or the fourth recess g4. Like the embodiment shown in FIG. 26, the fourth recesses g4 may be formed at the corners of the base 210, and the second recesses g2, which are adjacent to each other with the corners of the base 210 therebetween, may be connected through the fourth recesses g4.

Figure 28:
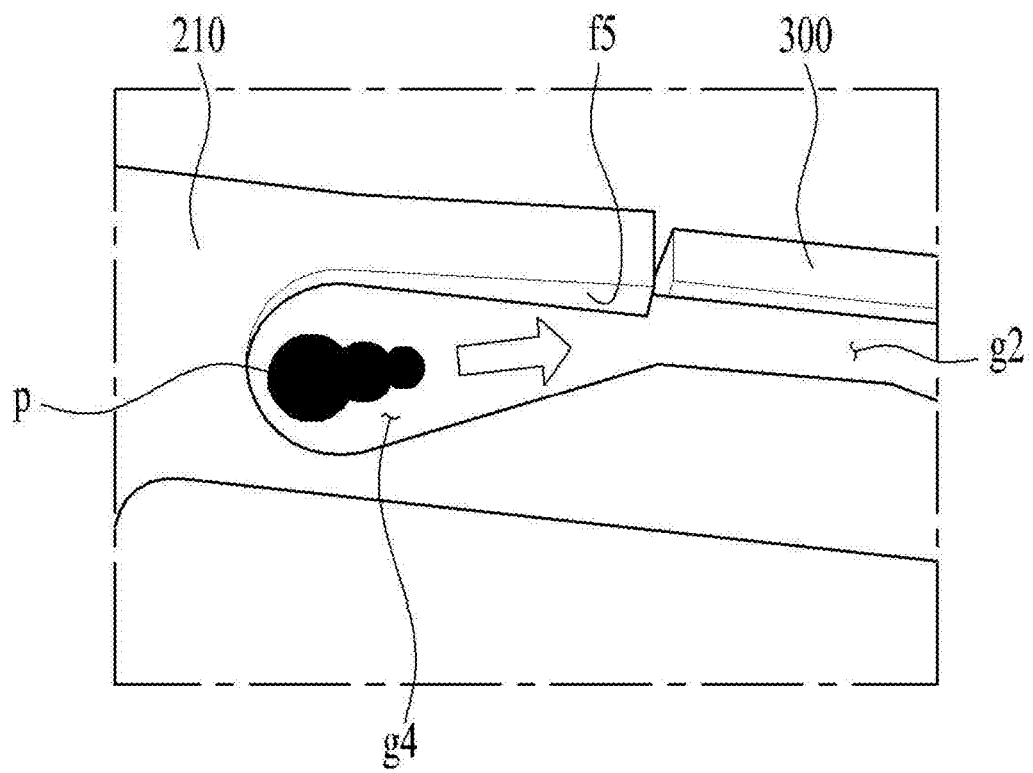
FIG. 28 is a view showing a second recess.
Figure 29:
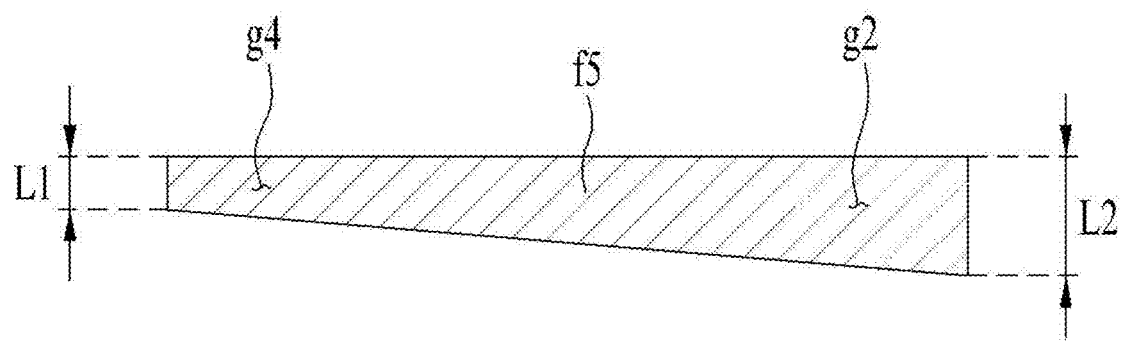
FIG. 29 is a schematic view showing a side surface of the second recess.

FIG. 28 is a view showing the second recess g2. FIG. 29 is a schematic view showing a side surface f5 of the second recess g2.

As shown in FIGS. 28 and 29, the second recess g2 including the fourth recess g4 may be inclined toward the end from the center of the side of the base 210 so as to be increasingly widened toward the adjacent side of the square base 210.

Thanks to the inclined structure, adhesive p, which has been introduced into the fourth recess g4, may easily flow into the second recess g2 so as to fill the gap, that is, the area to be bonded, thus enable the bonding procedure to be rapidly completed.

As shown in FIG. 29, the fourth recess g4 may be configured such that the minimum depth L1 of the fourth recess g4 is greater than the maximum depth L2 of the second recess g2. During the bonding procedure, the upper end of the side surface f5 of the second recess g2 including the fourth recess g4 is positioned to be horizontal or almost horizontal. Accordingly, the side surface f5 of the second recess g2 is inclined, and the bottom of the second recess g2 is also inclined.

Consequently, the adhesive p, which has been introduced into the fourth recess g4, may smoothly flow along the bottom of the second recess g2, and may then be introduced in the gap, that is, the area to be bonded, thus sealing the gap.

Any of the second recess g2, the third recess g3 and the fourth recess g4 in the respective embodiments shown in FIGS. 23 to 27 may be inclined toward the outside from the inside of the base 210 so as to be increasingly deepened.

Accordingly, since the respective recesses formed in the bottom surface of the base 210 are deepened toward the outside from the inside of the base 210, adhesive p introduced in the respective recesses may more smoothly flow into the gaps, thus enabling the bonding procedure to be rapidly completed.

The lens moving apparatus according to the above embodiments may be applied to products in various fields, for example camera modules. Such a camera module may be applied, for example, to mobile devices such as cellular phones.

The camera module according to the embodiment may include a lens barrel coupled to the bobbin 110, an image sensor (not shown), a printed circuit board 250 and an optical system.

The lens barrel is as described above, and the printed circuit board 250 is the component on which the image sensor is mounted, and may constitute the bottom surface of the camera module.

The optical system may include at least one lens for transmitting an image to the image sensor. The optical system may be provided with an actuator module capable of fulfilling functions of autofocusing and handshake correction. The actuator module functioning to fulfill the function of autofocusing may be variously constructed, and a voice coil unit motor is primarily used in the actuator module. The lens moving apparatus according to the embodiments may serve as an actuator module fulfilling both functions of autofocusing and handshake correction.

The camera module may further include an infrared ray screening filter (not shown). The infrared ray screening filter functions to block the incidence of light in the infrared range on the image sensor. In the base 210 illustrated in FIG. 2, the infrared ray screening filter may be installed at a position corresponding to the image sensor, and may be coupled to a holder member (not shown). The base 210 may support the lower portion of the holder member.

The base 210 may be provided with an additional terminal member for conductive connection to the printed circuit board 250, and the terminal may be integrally formed using a surface electrode. The base 210 may serve as a sensor holder for protecting the image sensor. In this case, although a projecting portion may be formed downward along the lateral side surface of the base 210, it is not an essential component. Although not shown in the drawings, an additional sensor holder may be disposed under the base 210 to serve as the projecting portion.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens moving apparatus comprising:
a housing comprising a magnet mounting seat;
a bobbin disposed in the housing;
a first coil disposed on the bobbin;
a magnet disposed in the magnet mounting seat; and
an adhesive disposed between the magnet and the magnet mounting seat,
wherein the magnet mounting seat is positioned at a corner of the housing, and
wherein a lower surface of the housing is recessed upwards, in a vertical direction parallel to an optical axis of the lens moving apparatus, so as to form an adhesive inlet at a lower portion of a side surface of the magnet mounting seat, the adhesive inlet exposing, in a lateral direction perpendicular to the vertical direction, the magnet mounting seat to an outside of the housing.

2. The lens moving apparatus according to claim 1, wherein the magnet mounting seat is a recess or a hole.

3. The lens moving apparatus according to claim 1, wherein the adhesive inlet is disposed at a lower portion of the corner of the housing.

4. The lens moving apparatus according to claim 1, wherein the magnet mounting seat is a recess comprising an upper surface facing an upper surface of the magnet, a first side surface facing a first side surface of the magnet, a second side surface connected to one side edge of the first side surface of the recess, a third side surface connected to an other side edge of the first side surface of the recess, and an open plane disposed between one side edge of the second side surface not connected to the first side surface and one side edge of the third side surface not connected to the first side surface.

5. The lens moving apparatus according to claim 4, wherein the adhesive inlet is formed in the first side surface of the recess.

6. The lens moving apparatus according to claim 4, wherein the adhesive inlet is formed in each of the first and second side surfaces of the recess.

7. The lens moving apparatus according to claim 4, wherein the adhesive inlet is formed in each of the first to third side surfaces of the recess.

8. The lens moving apparatus according to claim 4, wherein the adhesive is disposed between the first to third side surfaces of the recess and the magnet, and
wherein the adhesive is disposed between the upper surface of the magnet mounting seat and the magnet.

9. A lens moving apparatus comprising:
a cover;
a housing disposed in the cover and comprising a magnet mounting seat;
a bobbin disposed in the housing for mounting a lens barrel;
a first coil disposed on the bobbin;
a magnet disposed in the magnet mounting seat;
an adhesive disposed between the magnet and the magnet mounting seat;
an elastic member coupled to the bobbin and the housing;
a support member disposed on a side surface of the housing and coupled to the elastic member;
a second coil disposed below the housing; and
a base disposed below the second coil,
wherein the magnet mounting seat is positioned at a corner of the housing, and
wherein a lower surface of the housing is recessed upwards, in a vertical direction parallel to an optical axis of the lens moving apparatus, so as to form an adhesive inlet at a lower portion of a side surface of the magnet mounting seat, the adhesive inlet exposing, in a lateral direction perpendicular to the vertical direction, the magnet mounting seat to an outside of the housing.

10. The lens moving apparatus according to claim 9, comprising a printed circuit board disposed between the second coil and the base.

11. The lens moving apparatus according to claim 10, wherein the printed circuit board includes at least one terminal member that is bent therefrom.

12. The lens moving apparatus according to claim 11, wherein a first recess is formed in both sides of an upper portion of the at least one terminal member, and
wherein the first recess is defined by a first surface which is defined by one end if the terminal member, a second surface which is defined by one end of the cover, and a third surface which is defined by one end of the base.

13. The lens moving apparatus according to claim 9, wherein the housing comprises a first side surface and a second side surface, and
wherein the magnet is disposed on the first side and the support member is disposed on the second side surface.

14. The lens moving apparatus according to claim 9, wherein the magnet mounting seat is a recess comprising an upper surface facing an upper surface of the magnet, a first side surface facing a first side surface of the magnet, a second side surface connected to one side edge of the first side surface of the recess, a third side surface connected to an other side edge of the first side surface of the recess, and an open plane disposed between one side edge of the second side surface not connected to the first side surface and one side edge of the third side surface not connected to the first side surface;
wherein the housing comprises at least one first flow restrictor formed on the upper surface of the first magnet mounting seat, and
wherein the at least one first flow restriction is formed at an inner position spaced away from the open plane of the first magnet mounting seat.

15. The lens moving apparatus according to claim 9, wherein the housing comprises:
a bobbin mounting seat provided over the first magnet mounting seat and in which the bobbin is partially received; and
a second flow restrictor provided at an area where the bobbin mounting seat meets an inner surface of the housing in a first direction.

16. The lens moving apparatus according to claim 15, wherein the second flow restrictor is provided at an area where a lower surface of the bobbin mounting seat meets the inner surface of the housing.

17. The lens moving apparatus according to claim 9, comprising a detection sensor comprising two Hall sensors disposed on the base and configured to detect a movement of the housing.

18. a lens moving apparatus comprising:
a cover;
a housing disposed in the cover and comprising a magnet mounting seat;
a bobbin disposed in the housing for mounting a lens barrel;
a first coil disposed on the bobbin;
a magnet disposed in the magnet mounting seat;
an adhesive disposed between the magnet and the magnet mounting seat;
an elastic member coupled to the bobbin and the housing;
a support member disposed on a side surface of the housing and coupled to the elastic member;
a second coil disposed below the housing;
a base disposed below the second coil; and
a printed circuit board disposed between the second coil and the base and comprising at least one terminal member that is bent to an outer side surface of the base,
wherein the magnet mounting seat comprises four mounting seats positioned at four corners of the housing, and
wherein the magnet comprises four magnets, and each of the four magnets is respectively disposed in a corresponding one of the four mounting seats, and
wherein a lower surface of the housing is recessed upwards, in a vertical direction parallel to an optical axis of the lens moving apparatus, so as to form four adhesive inlets at respective lower portions of side surfaces of the four mounting seats, each adhesive inlet exposing, in a lateral direction perpendicular to the vertical direction, the respective mounting seat to an outside of the housing.

\* \* \* \* \*